(12) United States Patent
Trail

(10) Patent No.: US 11,209,650 B1
(45) Date of Patent: Dec. 28, 2021

(54) WAVEGUIDE BASED DISPLAY WITH MULTIPLE COUPLING ELEMENTS FOR ARTIFICIAL REALITY

(71) Applicant: Facebook Technologies, LLC, Menlo Park, CA (US)

(72) Inventor: Nicholas Daniel Trail, Bothell, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 536 days.

(21) Appl. No.: 16/123,887

(22) Filed: Sep. 6, 2018

(51) Int. Cl.
*G02B 27/01* (2006.01)
*F21V 8/00* (2006.01)

(52) U.S. Cl.
CPC ......... *G02B 27/0172* (2013.01); *G02B 6/005* (2013.01); *G02B 6/0023* (2013.01); *G02B 6/0076* (2013.01); *G02B 2027/0123* (2013.01); *G02B 2027/0178* (2013.01)

(58) Field of Classification Search
USPC ....................................................... 359/630
See application file for complete search history.

(56) References Cited

U.S. PATENT DOCUMENTS

| | | | |
|---|---|---|---|
| 1,021,981 A | 4/1912 | Galland | |
| 9,190,074 B1 | 11/2015 | Lebeau et al. | |
| 9,304,332 B2 | 4/2016 | Fonte et al. | |
| 9,581,820 B2 | 2/2017 | Robbins | |
| 9,664,902 B1 | 5/2017 | Raffle et al. | |
| 10,067,359 B1 | 9/2018 | Ushakov | |
| 10,175,489 B1 | 1/2019 | Robbins et al. | |
| 10,180,579 B2 | 1/2019 | Mak | |
| 10,197,803 B2 | 2/2019 | Badiali et al. | |
| 10,204,456 B2 | 2/2019 | Kudirka et al. | |
| 10,228,566 B2 | 3/2019 | von und zu Liechtenstein | |
| 10,371,944 B2 | 8/2019 | Mallinson | |
| 10,481,321 B1 | 11/2019 | Trail et al. | |
| 2006/0132914 A1* | 6/2006 | Weiss | G02B 27/0172 359/462 |
| 2011/0242481 A1 | 10/2011 | Wada | |
| 2014/0240313 A1 | 8/2014 | Varga | |
| 2016/0011419 A1* | 1/2016 | Gao | G02B 27/0172 359/471 |
| 2016/0231570 A1 | 8/2016 | Levola et al. | |
| 2016/0316249 A1 | 10/2016 | Smith | |
| 2016/0327811 A1 | 11/2016 | Haddadi et al. | |
| 2016/0357032 A1 | 12/2016 | Cabeza-Guillen et al. | |
| 2017/0045742 A1 | 2/2017 | Greenhalgh et al. | |
| 2017/0098312 A1 | 4/2017 | Souchard | |
| 2017/0108697 A1 | 4/2017 | El-Ghoroury et al. | |

(Continued)

OTHER PUBLICATIONS

U.S. Appl. No. 16/123,892, "Non-Final Office Action", dated Apr. 9, 2019, 12 pages.

(Continued)

*Primary Examiner* — Robert E. Tallman
(74) *Attorney, Agent, or Firm* — Weaver Villeneuve & Sampson LLP

(57) ABSTRACT

By tiling multiple waveguide displays in an artificial-reality system, and/or using multiple projectors per waveguide display, a large field of view for the artificial-reality system can be achieved using waveguide displays. By using waveguide displays, a form factor for a virtual-reality system can be reduced compared to conventional virtual-reality systems.

19 Claims, 13 Drawing Sheets

(56) References Cited

U.S. PATENT DOCUMENTS

| | | | |
|---|---|---|---|
| 2018/0074346 A1 | 3/2018 | Tsai | |
| 2018/0113309 A1 | 4/2018 | Robbins et al. | |
| 2018/0164610 A1 | 6/2018 | Liang | |
| 2018/0172995 A1 | 6/2018 | Lee et al. | |
| 2018/0182314 A1 | 6/2018 | Staton et al. | |
| 2018/0231779 A1 | 8/2018 | Bohn | |
| 2018/0259767 A1 | 9/2018 | Wu et al. | |
| 2018/0261010 A1 | 9/2018 | Kudirka et al. | |
| 2018/0275411 A1 | 9/2018 | Schowengerdt et al. | |
| 2018/0293041 A1 | 10/2018 | Harviainen | |
| 2019/0018247 A1 | 1/2019 | Gao et al. | |

OTHER PUBLICATIONS

U.S. Appl. No. 16/123,892, "Notice of Allowance", dated Jul. 17, 2019, 8 pages.

Santini, "All About That BASE (CURVE)", retrieved from https://www.2020mag.com/article/all-about-that-base-curve and printed on Nov. 6, 2018, 10 pages.

"Prescription Lens Explanation", retrieved from https://www.adseyewear.com/Prescription-Lens-Explanation and printed on Nov. 6, 2018, 10 pages.

"Suncloud Optics US", retrieved from https://www.suncloudoptics.com/techlens Dec. 12, 2017 and printed on Nov. 6, 2018, 6 pages.

"Base Curve Design", retrieved from https://www.pinterest.com/pin/74942781277543368 and printed on Nov. 6, 2018, 4 pages.

Denney, "Optical Measurements—Boxing System and RX Measurements", retrieved from https://eyenerds.com/blogs/eye-nerds/optical-measurements-boxing-system-and-rx-measurements Dec. 12, 2017 and printed on Nov. 6, 2018, 7 pages.

Santini, "The Real Details of Vertex, Tilt and Wrap", retrieved from https://www.2020mag.com/ce/the-real-details-of-vertex-5E16F and printed on Nov. 6, 2018, 10 pages.

Optician Club, "How To Measure Wrap Angile or Ztilt", retrieved from http://www.opticianclub.com/how-to-measure-wrap-angle-or-ztilt.html Dec. 12, 2017 and printed on Nov. 6, 2018, 2 pages.

U.S. Appl. No. 16/123,879, "Notice of Allowance", dated Jan. 15, 2020, 11 pages.

U.S. Appl. No. 16/123,879, "Non-Final Office Action", dated Jan. 11, 2019, 8 pages.

U.S. Appl. No. 16/123,879, "Non-Final Office Action", dated Sep. 26, 2019, 8 pages.

* cited by examiner

WAVEGUIDE BASED DISPLAY WITH MULTIPLE COUPLING ELEMENTS FOR ARTIFICIAL REALITY

CROSS-REFERENCES TO RELATED APPLICATIONS

The following three U.S. patent applications (including this one) are being filed concurrently, and the entire disclosures of the other applications are incorporated by reference into this application for all purposes:
Application Ser. No. 16/123,879, filed Sep. 6, 2018, entitled "Waveguide-Based Display for Artificial Reality";
Application Ser. No. 16/123,892, filed Sep. 6, 2018, entitled "Canted Augmented Reality Display for Improved Ergonomics" (hereinafter "the '892 application"; and
Application Ser. No. 16/123,887, filed Sep. 6, 2018, entitled "Waveguide Based Display with Multiple Coupling Elements for Artificial Reality."

BACKGROUND

This disclosure relates generally to near-eye-display systems, and more specifically to waveguide displays. Conventional near-eye displays generally have a display element that generates image light that passes through one or more lenses before reaching a user's eyes. Additionally, near-eye displays in virtual-reality (VR) systems and/or augmented-reality (AR) systems have design criteria to be compact, be light weight, and provide a large eye box and a wide field-of-view (FOV). Traditionally, VR displays are a magnifier optics display, where a computer generates an image and optics are used to magnify the image, and present to the user at a comfortable viewing distance. However, it is challenging to design near-eye displays to simultaneously achieve a small form factor, a large FOV, and/or a large eye box, especially with classical optical architectures.

SUMMARY

The present disclosure relates to artificial-reality displays. More specifically, and without limitation, this disclosure relates to using one or more waveguide stacks in a virtual-reality display. In some embodiments, multiple waveguide displays and/or two or more projectors are used in a virtual-reality display assembly for each eye to create an immersive experience for the user. In some embodiments, using a waveguide display provides for a small form factor (e.g., overall size and/or weight being at smaller/lighter than current market capability) of the virtual-reality system.

BRIEF DESCRIPTION OF THE DRAWINGS

Illustrative embodiments are described with reference to the following figures.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive.

Figure 1:
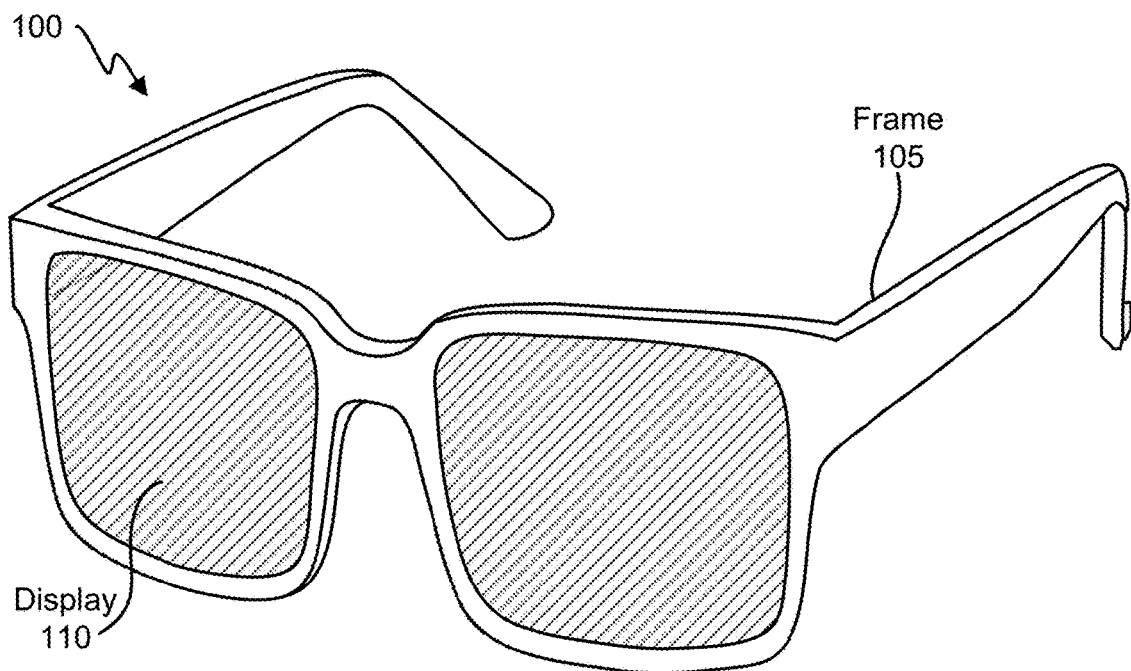
FIG. 1 is a diagram of an embodiment of a near-eye display.

FIG. 1 is a diagram of an embodiment of a near-eye display 100. The near-eye display 100 presents media to a user. Examples of media presented by the near-eye display 100 include one or more images, video, and/or audio. In some embodiments, audio is presented via an external device (e.g., speakers and/or headphones) that receives audio information from the near-eye display 100, a console, or both, and presents audio data based on the audio information. The near-eye display 100 is generally configured to operate as a virtual reality (VR) display. In some embodiments, the near-eye display 100 is modified to operate as an augmented reality (AR) display and/or a mixed reality (MR) display.

The near-eye display 100 includes a frame 105 and a display 110. The frame 105 is coupled to one or more optical elements. The display 110 is configured for the user to see content presented by the near-eye display 100. In some embodiments, the display 110 comprises a waveguide display assembly for directing light from one or more images to an eye of the user.

Figure 2:
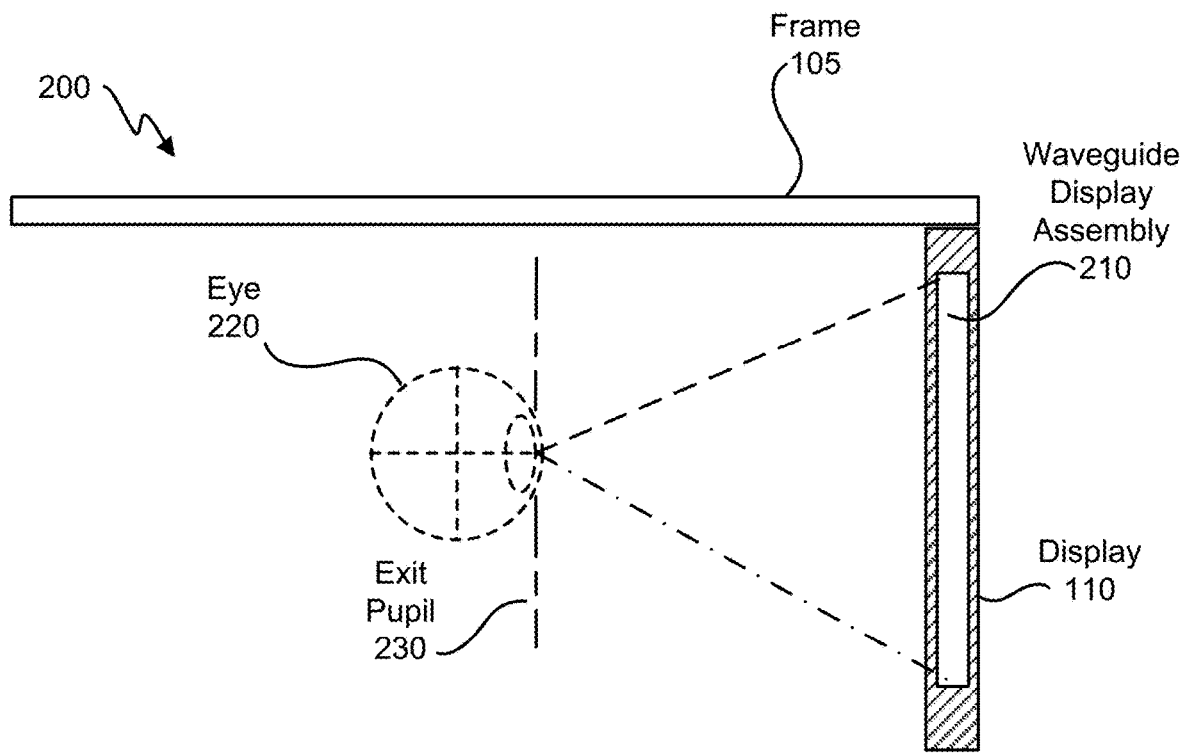
FIG. 2 is an embodiment of a cross section of the near-eye display.

FIG. 2 is an embodiment of a cross section 200 of the near-eye display 100 illustrated in FIG. 1. The display 110 includes at least one waveguide display assembly 210. An exit pupil 230 is a location where the eye 220 is positioned in an eye box region when the user wears the near-eye display 100. For purposes of illustration, FIG. 2 shows the cross section 200 associated with an eye 220 and a waveguide display assembly 210; a second waveguide display assembly is used for a second eye of a user.

The waveguide display assembly 210 is configured to direct image light to an eye box located at the exit pupil 230 and to the eye 220. The waveguide display assembly 210 may be composed of one or more materials (e.g., plastic, glass, etc.) with one or more refractive indices. In some embodiments, the near-eye display 100 includes one or more optical elements between the waveguide display assembly 210 and the eye 220. In some embodiments, the waveguide display assembly 210 includes one or more waveguide displays to generate a singular view to a user.

Figure 3:
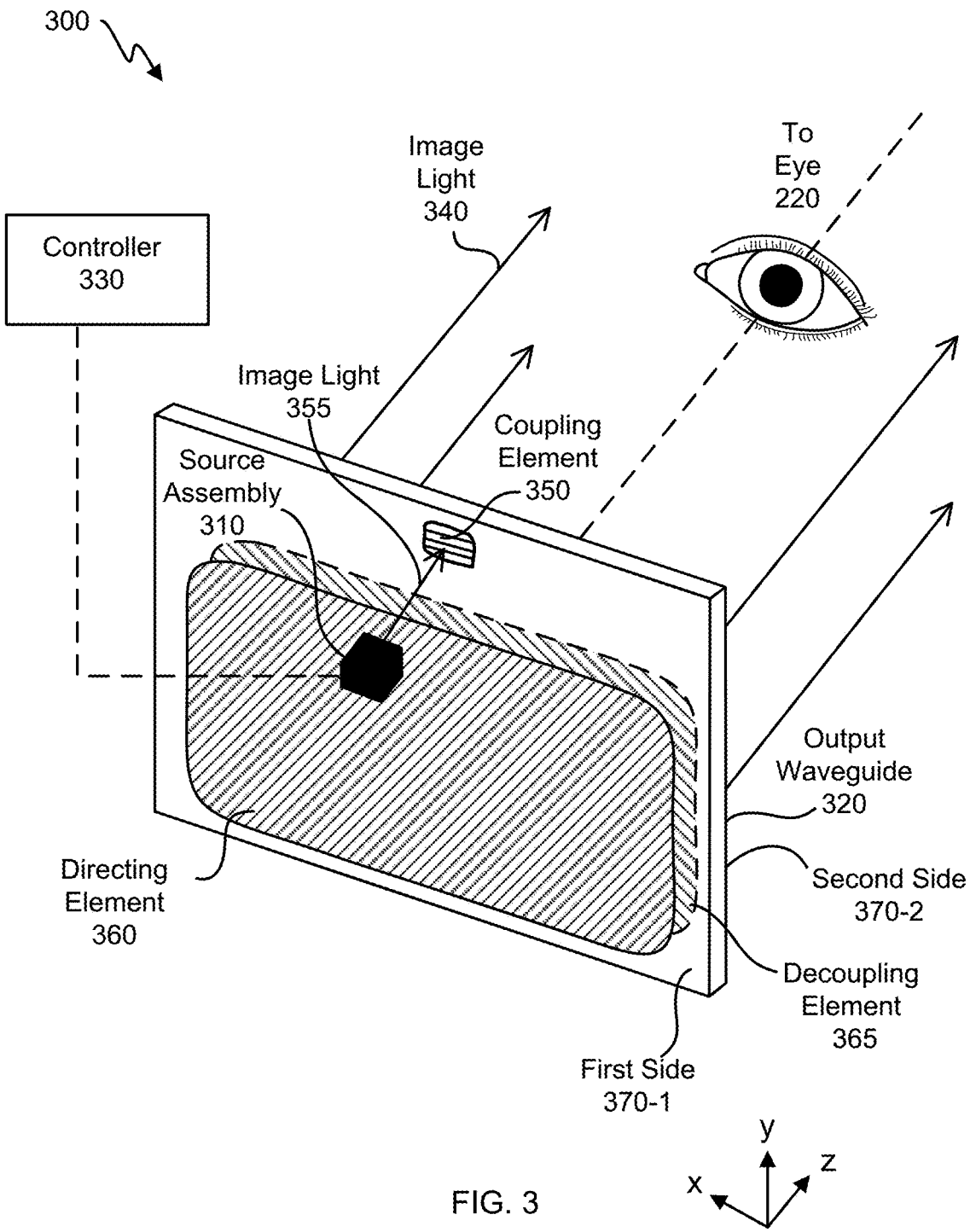
FIG. 3 illustrates an isometric view of an embodiment of a waveguide display.

FIG. 3 illustrates an isometric view of an embodiment of a waveguide display 300. In some embodiments, the waveguide display 300 is a component of the waveguide display assembly 210 of the near-eye display 100. In some embodiments, the waveguide display 300 is part of some other near-eye display or other system that directs image light to a particular location.

The waveguide display 300 includes a source assembly 310, an output waveguide 320, and a controller 330. For purposes of illustration, FIG. 3 shows the waveguide display 300 associated with a single eye 220, but in some embodiments, another waveguide display, whether separate or partially separate from the waveguide display 300, provides image light to another eye of the user.

The source assembly 310 generates image light 355. The source assembly 310 generates and outputs the image light 355 to a coupling element 350 located on a first side 370-1 of the output waveguide 320. The output waveguide 320 is an optical waveguide that outputs expanded image light 340 to an eye 220 of a user. The output waveguide 320 receives the image light 355 at one or more coupling elements 350 located on the first side 370-1 and guides received input image light 355. In some embodiments, the coupling element 350 couples the image light 355 from the source assembly 310 into the output waveguide 320. The coupling element 350 may be, e.g., a diffraction grating, a holographic grating, one or more cascaded reflectors, one or more prismatic surface elements, a metalens, a refractive surface at an angle with or without optical power, and/or an array of holographic reflectors.

Light from the output waveguide 320 is coupled out of the output waveguide 320 using a decoupling element 365. The output waveguide is used as a pupil expander. Expanded image light 340 decoupled from the output waveguide 320 is transmitted to the eye 220 of a user. In some embodiments, a directing element 360 is used to redirect light in the output waveguide 320 to the decoupling element 365. The directing element 360 is part of, or affixed to, the first side 370-1 of the output waveguide 320. The decoupling element 365 is part of, or affixed to, the second side 370-2 of the output waveguide 320, such that the directing element 360 is opposed to the decoupling element 365. The directing element 360 and/or the decoupling element 365 may be, e.g., a diffraction grating, a holographic grating, one or more cascaded reflectors, one or more prismatic surface elements, a Bragg grating, and/or an array of holographic reflectors. In some embodiments, the directing element 360 can be similar to the decoupling element 365, the directing element 360 can be part of the decoupling element 365, the directing element 360 can be on the second side 370-2, the decoupling element 365 can be on the first side 370-1, the directing element 360 and/or the decoupling element 365 can be between the first side 370-1 and the second side 370-2, and/or the directing element 360 and/or the decoupling element 365 can be absent or part of the directing element 360.

The second side 370-2 represents a plane along an x-dimension and a y-dimension. The output waveguide 320 may be composed of one or more materials that facilitate total internal reflection of the image light 355 with a transparency in wavelength bands of interest. The output waveguide 320 may be composed of plastic, glass, and/or polymers. The output waveguide 320 has a relatively small form factor. For example, the output waveguide 320 may be approximately 50 millimeters (mm) wide along an x-dimension; 30 mm long along a y-dimension; and 0.3 to 5.0 mm thick along a z-dimension.

In some embodiments, the waveguide display 300 comprises multiple output waveguides 320. For example, waveguide display 300 comprises a stacked waveguide display. The stacked waveguide display is a polychromatic display that can be projected on multiple planes (e.g. multi-planar colored display; a red-green-blue (RGB) display created by stacking output waveguides 320 used for different colors). The stacked waveguide display can comprise three output waveguides 320, one output waveguide 320 for red light, one output waveguide 320 green light, and one output waveguide 320 blue light (sometimes referred to as a waveguide stack). In some configurations, two output waveguides 320 are used (e.g., a "red" waveguide and a "blue" waveguide, where "green" is shared between the red waveguide and the blue waveguide). In some configurations, the stacked waveguide display is a display that can be projected on multiple planes (e.g. multi-planar monochromatic display). In some configurations, the waveguide display 300 is a varifocal waveguide display. The varifocal waveguide display is a display that can adjust a focal position of image light emitted from the waveguide display. In some embodiments, the waveguide display assembly 210 may include the stacked waveguide display and the varifocal waveguide display. In some embodiments, a single output waveguide 320 is used for a wide spectrum of light. For example, a Bragg grating is used as the decoupling element 365 and out couples red, green, and blue light from the output waveguide 320.

The controller 330 controls light emitted from the source assembly 310. For example, the controller 330 controls scanning operations of the source assembly 310 and/or timing of light sources turning off and on. The controller 330 can determine scanning instructions for the source assembly 310. The controller 330 can be used to control full-field projector engines. In some embodiments, the output waveguide 320 outputs expanded image light 340. The expanded image light 340 provides an expanded eyebox (relative to a pupil area of the source assembly 310) with a large field of view (FOV) to the user's eye 220. For example, expanded image light 340 is provided to the user such that the waveguide display 300 provides a field of view equal to or greater than 60 degrees and equal to or less than 240 degrees in x and/or y. The output waveguide 320 is configured to provide an eye box with a length equal to or greater than 10 mm and equal to or less than 50 mm in x and/or y. The controller 330 can be used in conjunction with a graphics engine to render image information based on sensors measuring head and/or eye location.

Figure 4:
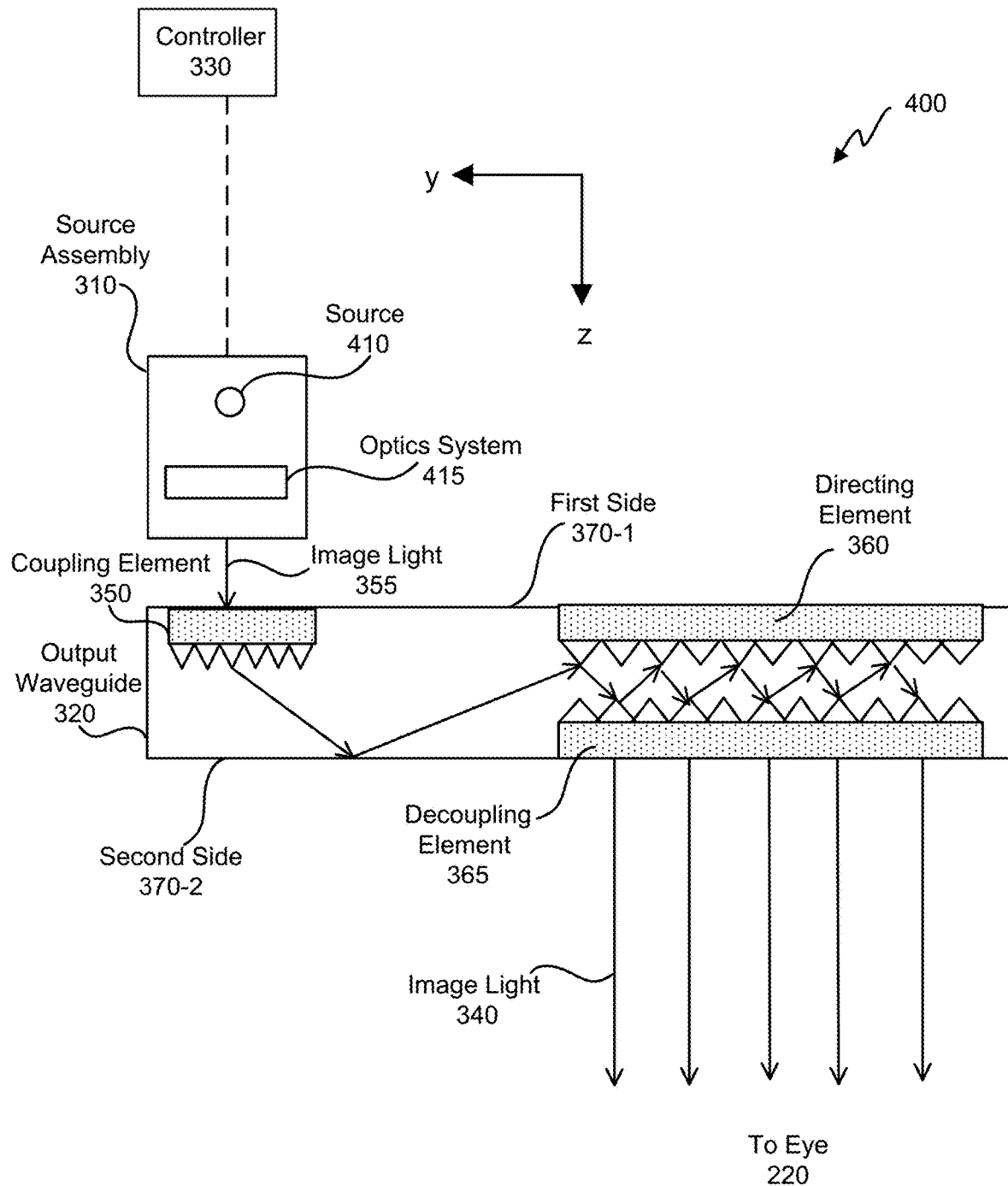
FIG. 4 illustrates a cross section of an embodiment of the waveguide display.

FIG. 4 illustrates an embodiment of a cross section 400 of the waveguide display 300. The cross section 400 includes the source assembly 310 and the output waveguide 320. The source assembly 310 generates image light 355 in accordance with instructions from the controller 330. The source assembly 310 includes a source 410 and an optics system 415. The source 410 is a light source that generates coherent, partially coherent, and/or incoherent light. The source 410 may be a laser diode, a vertical cavity surface emitting laser, a liquid-crystal-on-silicon, a superluminescent diode, and/or an organic or inorganic light emitting diode array (either through spatial or temporal control).

The optics system 415 includes one or more optical components that condition the light from the source 410. Conditioning light from the source 410 may include, e.g., expanding, collimating, and/or adjusting orientation in accordance with instructions from the controller 330. The one or more optical components may include one or more lens, liquid lens, mirror, freeform element, aperture, and/or grating. Light emitted from the optics system 415 (and also the source assembly 310) is sometimes referred to as image light 355.

The output waveguide 320 receives the image light 355. The coupling element 350 couples the image light 355 from the source assembly 310 into the output waveguide 320. In embodiments where the coupling element 350 is diffraction grating, a pitch of the diffraction grating is chosen such that total internal reflection occurs in the output waveguide 320, and the image light 355 propagates internally in the output waveguide 320 (e.g., by total internal reflection), toward the decoupling element 365. The directing element 360 redirects the image light 355 toward the decoupling element 365 for decoupling from the output waveguide 320.

In some embodiments, the directing element 360 and/or the decoupling element 365 are structurally similar. The expanded image light 340 exiting the output waveguide 320 is expanded along one or more dimensions (e.g., may be elongated along x-dimension). In some embodiments, the waveguide display 300 includes a plurality of source assemblies 310 and a plurality of output waveguides 320. Each of the source assemblies 310 emits a monochromatic image light of a specific band of wavelength corresponding to a color (e.g., red, green, or blue). Each of the output waveguides 320 may be stacked together with a distance of separation to output an expanded image light 340 that is multi-colored. In some embodiments, other color schemes are used (e.g., red, green, blue, green-blue). In some configurations, multiple source assemblies (e.g., 2 to 4 RGB source assemblies are used with 3 output waveguides 320, one red output waveguide, one green output waveguide, and one blue output waveguide).

Figure 5:
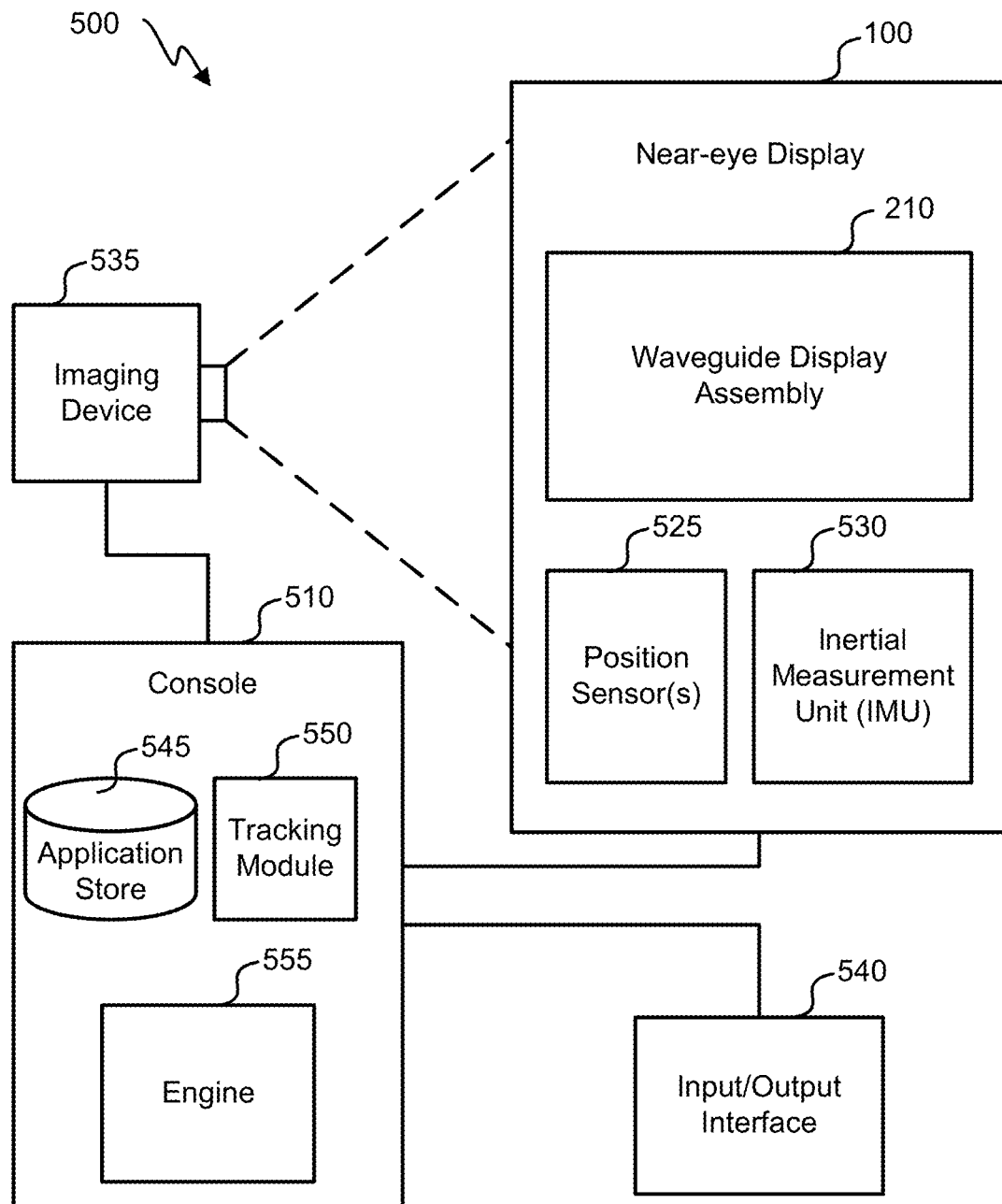
FIG. 5 is a block diagram of an embodiment of a system including the near-eye display.

FIG. 5 is a block diagram of an embodiment of a system 500 including the near-eye display 100. The system 500 comprises the near-eye display 100, an imaging device 535, and an input/output interface 540 that are each coupled to a console 510.

The near-eye display 100 is a display that presents media to a user. Examples of media presented by the near-eye display 100 include one or more images, video, and/or audio. In some embodiments, audio is presented via an external device (e.g., speakers and/or headphones) that receives audio information from the near-eye display 100 and/or the console 510 and presents audio data based on the audio information to a user. In some embodiments, the near-eye display 100 may also act as an AR eyewear glass. In some embodiments, the near-eye display 100 augments views of a physical, real-world environment, with computer-generated elements (e.g., images, video, sound, etc.).

The near-eye display 100 includes a waveguide display assembly 210, one or more position sensors 525, and/or an inertial measurement unit (IMU) 530. The waveguide display assembly 210 includes the source assembly 310, the output waveguide 320, and the controller 330. The IMU 530 is an electronic device that generates fast calibration data indicating an estimated position of the near-eye display 100 relative to an initial position of the near-eye display 100 based on measurement signals received from one or more of the position sensors 525. The imaging device 535 generates slow calibration data in accordance with calibration parameters received from the console 510. The imaging device 535 may include one or more cameras and/or one or more video cameras. The input/output interface 540 is a device that allows a user to send action requests to the console 510. An action request is a request to perform a particular action. For example, an action request may be to start or end an application or to perform a particular action within the application. The console 510 provides media to the near-eye display 100 for presentation to the user in accordance with information received from one or more of: the imaging device 535, the near-eye display 100, and the input/output interface 540. In the example shown in FIG. 5, the console 510 includes an application store 545, a tracking module 550, and an engine 555. The application store 545 stores one or more applications for execution by the console 510. An application is a group of instructions, that when executed by a processor, generates content for presentation to the user. Examples of applications include: gaming applications, conferencing applications, video playback application, or other suitable applications. The tracking module 550 calibrates the system 500 using one or more calibration parameters and may adjust one or more calibration parameters to reduce error in determination of the position of the near-eye display 100. The tracking module 550 tracks movements of the near-eye display 100 using slow calibration information from the imaging device 535. The tracking module 550 also determines positions of a reference point of the near-eye display 100 using position information from the fast calibration information.

The engine 555 executes applications within the system 500 and receives position information, acceleration information, velocity information, and/or predicted future positions of the near-eye display 100 from the tracking module 550. In some embodiments, information received by the engine 555 may be used for producing a signal (e.g., display instructions) to the waveguide display assembly 210 that determines a type of content presented to the user.

Figure 6:
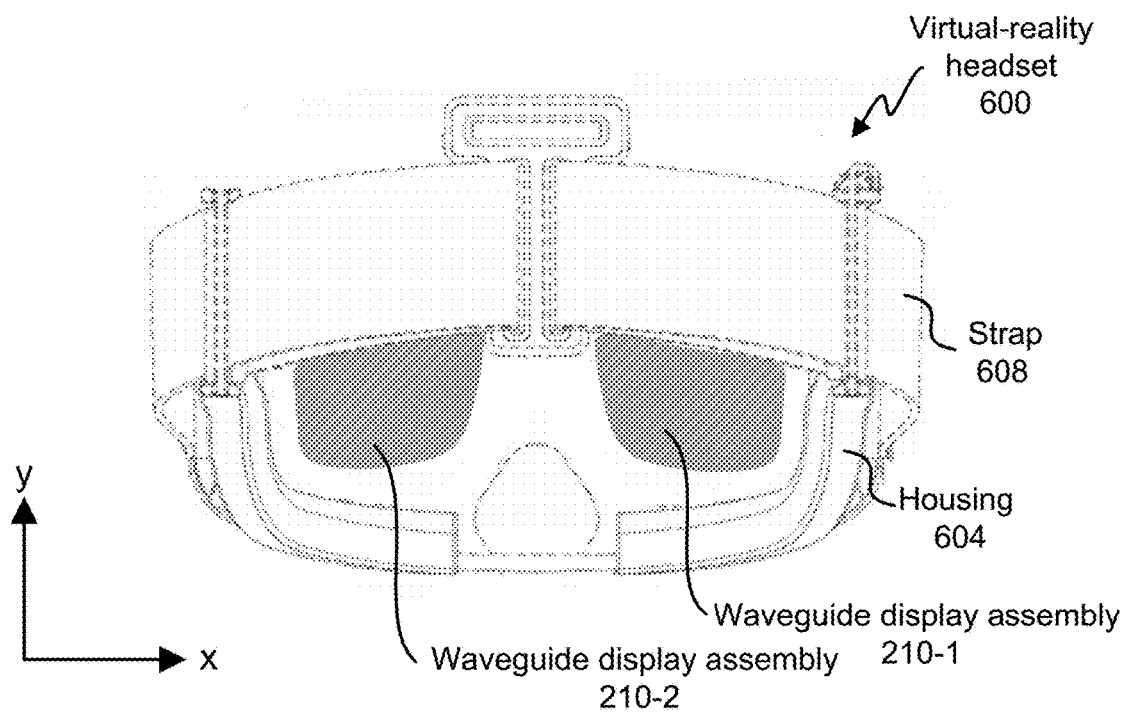
FIG. 6 is an embodiment of a virtual-reality headset.

FIG. 6 is an embodiment of a virtual-reality headset 600. The virtual-reality headset 600 comprises a housing 604, a first waveguide display assembly 210-1, and a second waveguide display assembly 210-2. A strap 608 is also shown. In some embodiments, glasses with temples and/or temple tips are used instead of the strap 608. The housing 604 is opaque to the user when worn (e.g., secured to a head of the user with the strap 608). The housing 604 is opaque to block ambient light (e.g., "real-world" light) from reaching the eyes 220 of the user. In some configurations, the housing can be made partially transparent (e.g., as an emergency mode for the user to see the real world; or to facilitate computer/real-world interaction without removing the headset during experiences). The virtual-reality headset 600 comprises one or more projectors (e.g., source assembly 310). In some embodiments, the virtual-reality headset 600 comprises two or more projectors per waveguide display assembly 210.

The first waveguide display assembly 210-1 and the second waveguide display assembly 210-2 are mounted in the housing 604 so that the user can see images projected by the waveguide display assemblies 210 while the virtual-reality headset 600 is worn. The first waveguide display assembly 210-1 presents images to a first eye of the user; the second waveguide display assembly 210-2 presents images to a second eye of the user. The waveguide display assembly 210 comprises one or more waveguide stacks 708. A waveguide stack 708 is an optical element that comprises one or more output waveguides 320. A waveguide stack 708 can be used to provide "white" light to a user covering a specified field-of-view (e.g., using a monolithic waveguide or through multiple waveguides that are "stacked" together, to facilitate achieving the full desired white color gamut). In this view, the waveguide display assembly 210 can have multiple waveguide stacks 708 and/or multiple source projectors associated with one or more waveguide stacks 708 to achieve a net larger field-of-view through optical (stack or projector, respectively) tiling.

Figure 7:
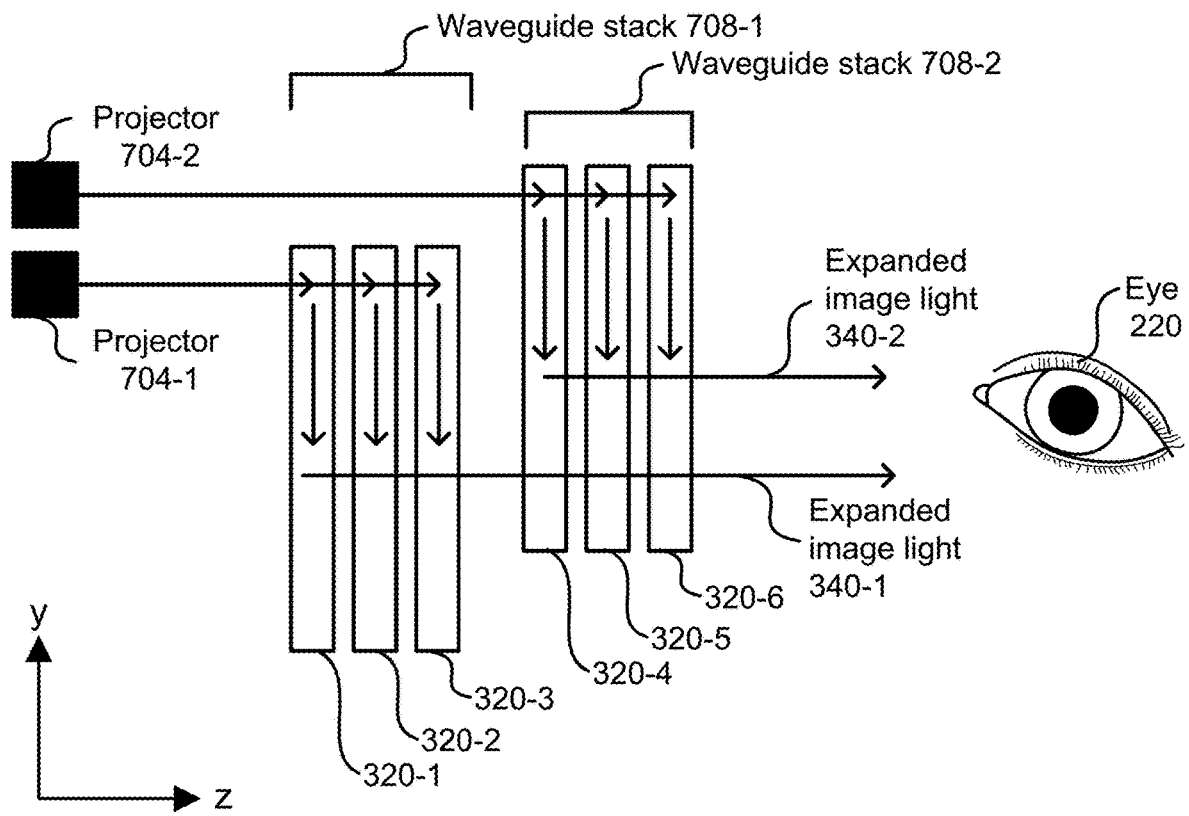
FIG. 7 is a simplified diagraph of using multiple projectors and multiple waveguide stacks to present multiple tiled images to an eye of a user of a virtual-reality headset.

FIG. 7 is a simplified diagram of an embodiment of using multiple projectors 704 and multiple waveguide displays 300 to present multiple images to an eye 220 of a user of the virtual-reality headset 600. The first waveguide display assembly 210-1 comprises a first waveguide stack 708-1, which is part of a first waveguide display, and a second waveguide stack 708-2, which is part of a second waveguide display. The first waveguide stack 708-1 comprises three output waveguides 320: a first output waveguide 320-1, a second output waveguide 320-2, and a third output waveguide 320-3. The second waveguide stack 708-2 comprises three output waveguides 320: a fourth output waveguide 320-4, a fifth output waveguide 320-5, and a sixth output waveguide 320-6.

The first projector 704-1 is configured to emit red light, green light, and blue light (e.g., using light-emitting diodes (LEDs), such as micro, organic or inorganic LEDs and/or lasers). The first projector 704-1 is part of the first waveguide display. The first output waveguide 320-1 is configured to guide red light from the first projector 704-1. The second output waveguide 320-2 is configured to guide green light from the first projector 704-1. The third output waveguide 320-3 is configured to guide blue light from the first projector 704-1. Light from the first output waveguide 320-1, the second output waveguide 320-2, and the third output waveguide 320-3 is out coupled toward the eye 220 of the user. Light from the first output waveguide 320-1, the second output waveguide 320-2, and the third output waveguide 320-3 forms a first image from first expanded image light 340-1.

The second projector 704-2 is configured to emit red light, green light, and blue light (e.g., using LEDs, such as micro, organic and inorganic, LEDs, and/or lasers). The second projector is part of the second waveguide display. The fourth output waveguide 320-4 is configured to guide red light from the second projector 704-2. The fifth output waveguide 320-5 is configured to guide green light from the second projector 704-2. The sixth output waveguide 320-6 is configured to guide blue light from the second projector 704-2. Light from the fourth output waveguide 320-4, the fifth output waveguide 320-5, and the sixth output waveguide 320-6 is out coupled toward the eye 220 of the user. Light from the fourth output waveguide 320-4, the fifth output waveguide 320-5, and the sixth output waveguide 320-6 forms a second image from a second expanded image light 340-2. The second image at least partially overlaps the first image. In some configurations, two or more projectors 704 are used per waveguide stack 708. Light from two, three, four, or five projectors 704 can be coupled into one waveguide stack 708 (e.g., to increase a field of view and/or resolution). For example, light from a third projector can be coupled into the first waveguide stack 708-1; or light from the second projector 704-2 can be coupled into the first waveguide stack 708-1, and the second waveguide stack 708-2 is not used. Projectors can have different resolutions (e.g., different resolution based on pixel size, focal length, and/or distortion).

In some embodiments, the first waveguide display assembly 210-1 comprises one to ten waveguide stacks 708 and/or the virtual-reality headset 600 comprises one to ten projectors 704 for coupling light into the one to ten waveguide stacks 708. By using multiple waveguide displays 300 (e.g., using multiple waveguide stacks 708 and/or projectors 704) per eye, a field of view to a user can be increased. Though waveguide displays 300 used for augmented reality provide a relatively large field of view, e.g., up to 70 degrees, virtual-reality systems use a larger field of view for a more immersive experience. Thus, in some embodiments, multiple waveguide stacks 708 and/or two or more projectors 704 are used in a waveguide display assembly 210 for one eye of the virtual-reality headset 600 to create a more immersive experience. In some configurations, one waveguide stack 708 is used with 2 to 4 projectors. In some configurations, one projector 704 is used, and light from the one projector 704 is coupled into two to four waveguide stacks 708. In some embodiments, using a waveguide display assembly 210 for the virtual-reality headset 600 reduces a form factor of the virtual-reality headset 600.

Figure 8A:
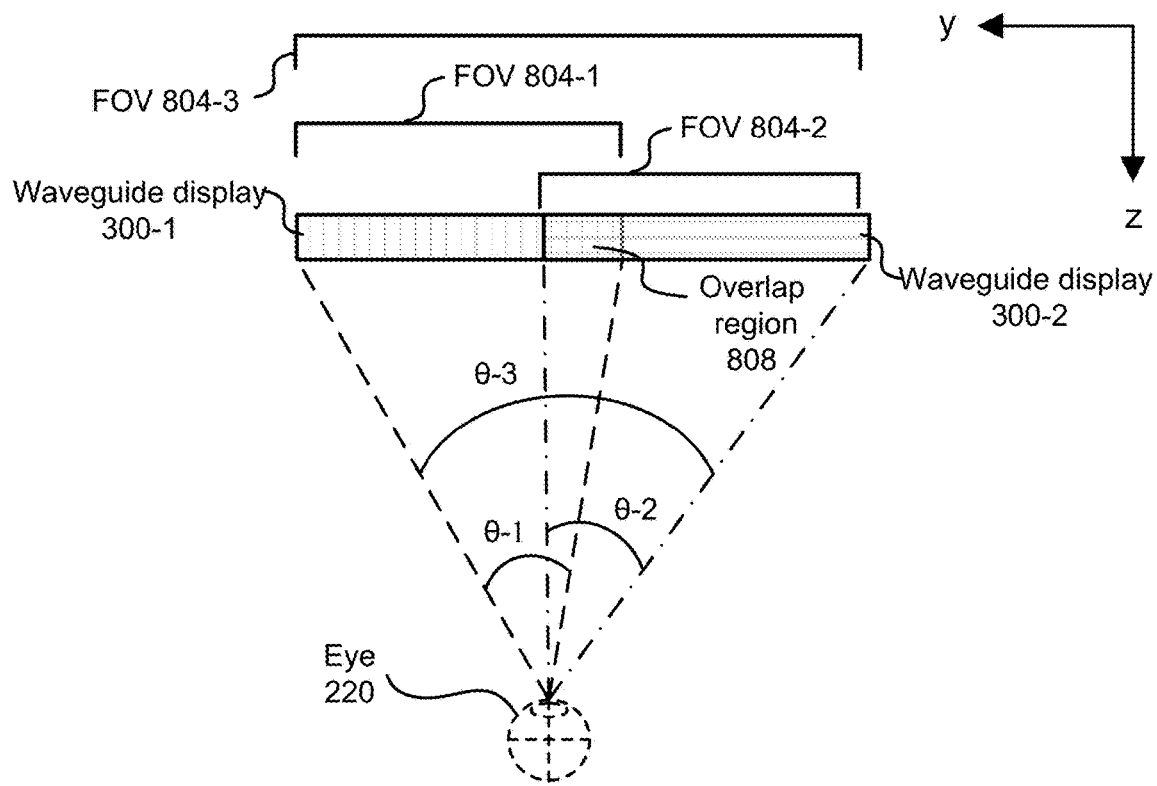
FIG. 8A illustrates overlapping fields of view of waveguide displays for a waveguide display assembly.

FIG. 8A illustrates an embodiment of overlapping fields of view of waveguide displays 300 to a user of the virtual-reality headset 600. A first waveguide display 300-1 (e.g., from the first waveguide stack 708-1) provides a first field of view (FOV) 804-1 to an eye 220 of the user. The first field of view 804-1 is measured by a first θ-1. In some embodiments, the first angle θ-1 is equal to or greater than 30 degrees and equal to or less than 70, 85, or 100 degrees.

A second waveguide display 300-2 (e.g., from the second waveguide stack 708-2) provides a second field of view 804-2 to the eye 220 of the user. The second field of view 804-2 is measured by a second angle θ-2. In some embodiments, the second angle θ-2 is equal to or greater than 30 degrees and equal to or less than 70, 85, or 100 degrees. The second field of view 804-2 partially overlaps with the first field of view 804-1. A third field of view 804-3 is a field of view of the waveguide display assembly 210. The third field of view 804-3 is a combination of the first field of view 804-1 and the second field of view 804-2. The third field of view 804-3 is measured by a third angle θ-3. For a waveguide display assembly 210 having two waveguide displays 300, the third angle θ-3 is less than a sum of the first angle θ-1 and the second angle θ-2 because there is overlap, in an overlap region 808, between the first waveguide display 300-1 and the second waveguide display 300-2.

In some embodiments, the second waveguide display 300-2 provides image light at a periphery of vision of the eye 220. Periphery can be outside a 30 degree cone radius while a person is looking forward. The second waveguide display 300-2 can have a lower resolution than the first waveguide display 300-1 because eye resolution at a periphery is not as high. Having lower resolution can help with power consumption of light sources and/or reducing complexity of projectors 704. In some embodiments, resolution of the first waveguide display 300-1 and/or resolution of the second waveguide display 300-2 varies (variable resolution) in the overlap region 808 so that resolution of the first waveguide display 300-1 is matched with resolution of the second waveguide display 300-2 (e.g., so a user does not see a discontinuity is resolution). Resolution of the first waveguide display 300-1 and/or resolution of the second waveguide display 300-2 can vary (variable resolution) so that where transition occurs, resolution exceeds human visual resolution (e.g., taking into account inter pupil distance and/or eye movement of a user). In some embodiments, variable resolution (e.g., variable spatial resolution) of the first waveguide display 300-1 and/or the second waveguide display 300-2 forms a resolution gradient of decreasing resolution toward a periphery of the eye 220. Resolution can be increased by having more than one projector 704 per waveguide display 300 or through projector design (e.g., changing distortion).

In some configurations, both the first waveguide display 300-1 and the second waveguide display 300-2 are for projecting images in a periphery of the waveguide display assembly 210, and a non-waveguide display is used in a fovea centralis field of view of a user with some margin for movement (e.g., margin of movement is an additional 10 or 15 degree radius to the centralis field of view). The fovea centralis of an eye has a field of view of about 18 degrees (e.g., 18 degrees, +/−2 degrees). A central axis of the waveguide display assembly 210 is a line that a visual axis of an eye 220 aligns with while the eye 220 is in a neutral position. The central axis is considered to be in a direction normal to the eye. Foveal view is a field of view within a 10 degree radius cone from visual axis. A central portion of the waveguide display assembly 210 is within a 20 degree radius cone of the central axis (e.g., +/−2, 3, or 4 degrees). A periphery of the waveguide display assembly 210 is outside the central portion. The central portion is larger than the foveal view to take into account some rotation of the eye 220. In some embodiments, the overlap region 808 is within 30 to 50 degrees from the central axis. In some embodiments, the second waveguide display 300-2 is in the periphery.

Figure 8B:
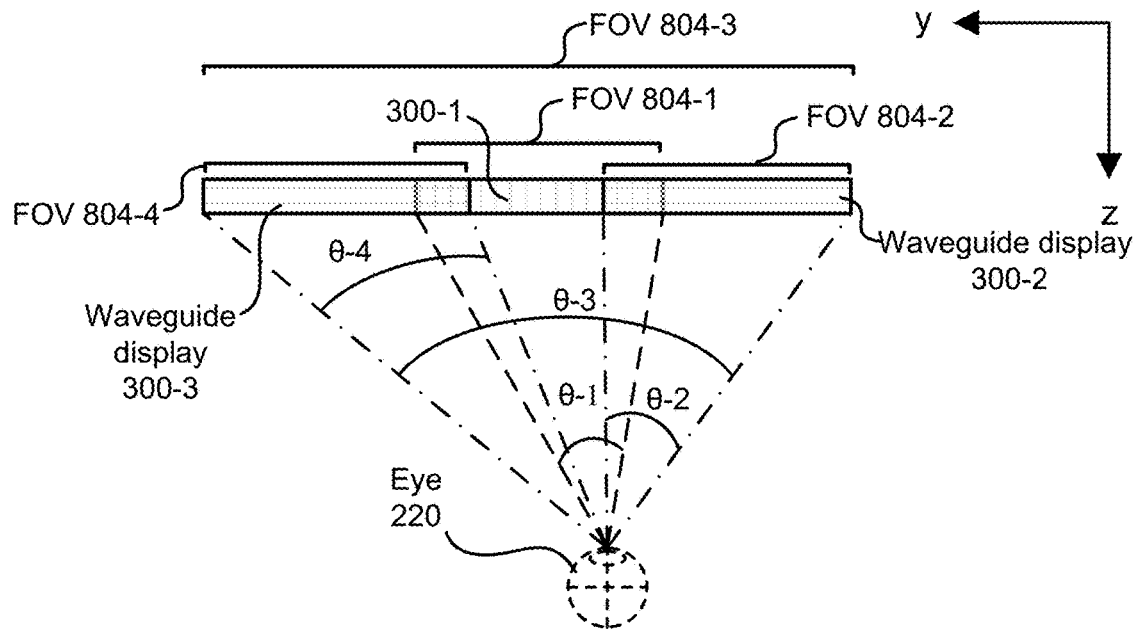
FIG. 8B illustrates overlapping fields of view of three waveguide displays of a waveguide display assembly.

FIG. 8B illustrates overlapping fields of view of three waveguide displays 300 of a waveguide display assembly 210. FIG. 8B is similar to FIG. 8A with the addition of a third waveguide display 300-3. The third waveguide display 300-3 provides a fourth field of view 804-4 measured by a fourth angle θ-4. The fourth field of the view 804-4 partially overlaps the first field of view 804-1. The waveguide display assembly 210 provides a field of view (FOV 804-3) that is smaller than the sum of the first field of view 804-1, the second field of view 804-2, and the fourth field of view 804-4. Put another way, the third angle θ-3 is equal to or less than the first angle θ-1+the second angle θ-2+the fourth angle θ-4. In some embodiments, the third field of view 804-3 of the waveguide display assembly 210 can be larger than the first field of view 804-1 of the first waveguide display 300-1 plus the second field of view 804-2 of the second waveguide display 300-2 because of the fourth field of view 804-4 of the third waveguide display 300-3 is part of the third field of view 804-3 of the waveguide display assembly 210. Additional waveguide displays 300 and/or projectors can be added to the waveguide display assembly 210 to increase the field of view (FOV 804-3) of the waveguide display assembly 210. In some embodiments, the third angle θ-3 is equal to or greater than 90, 105, 120, or 155 degrees and equal to or less than 120, 140, 160, 200, 240, or 260 degrees. In some embodiments, the field of view is measured as a linear field-of-view and can be asymmetric. The second waveguide display 300-2 and the third waveguide display 300-3 can have lower resolution than the first waveguide display 300-1.

Figure 9:
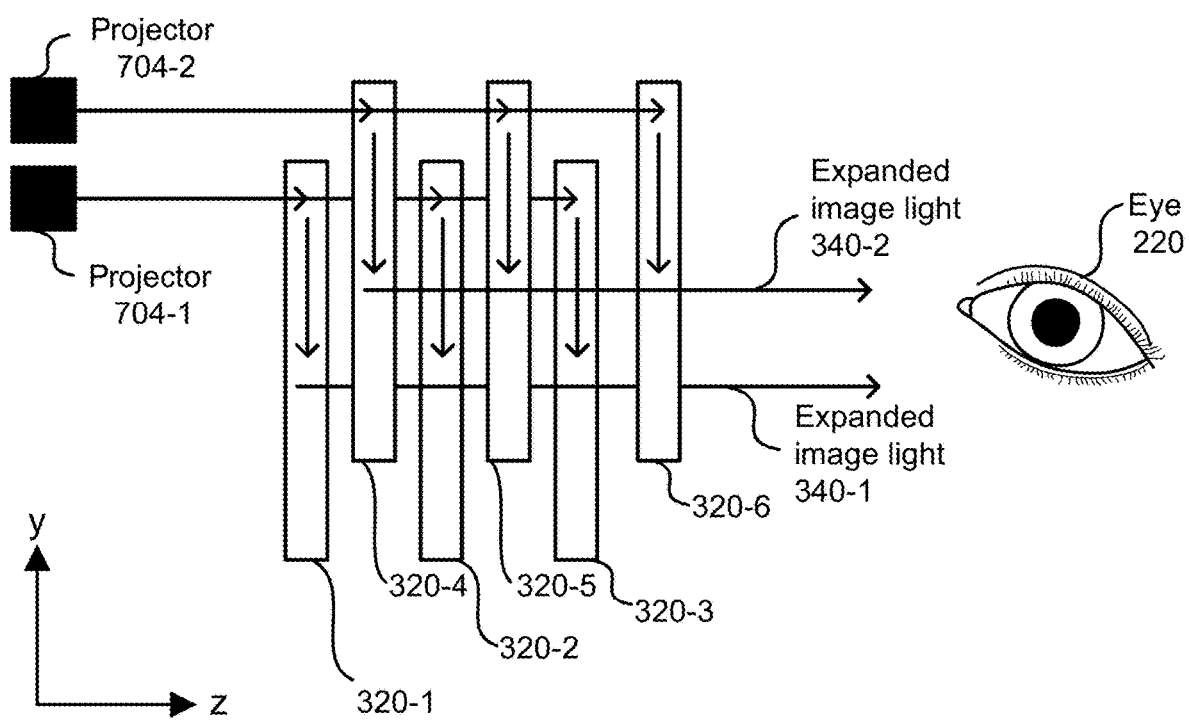
FIG. 9 is a simplified diagram of interweaving output waveguides of a first waveguide stack with output waveguides of a second waveguide stack.

FIG. 9 is a simplified diagram of an embodiment of interweaving output waveguides 320 of the first waveguide stack 708-1 with output waveguides 320 of a second waveguide stack 708-2. Instead of stacking output waveguides 320 RGB-RGB, the output waveguides 320 are stacked RR-GG-BB (e.g., for light transmission through other waveguides). Thus an output waveguide 320 of the first waveguide stack 708-1 is between output waveguides 320 of the second waveguide stack 708-2 (e.g., the second output waveguide 320-2 is between the fourth output waveguide 320-4 and the fifth output waveguide 320-5).

Figure 10:
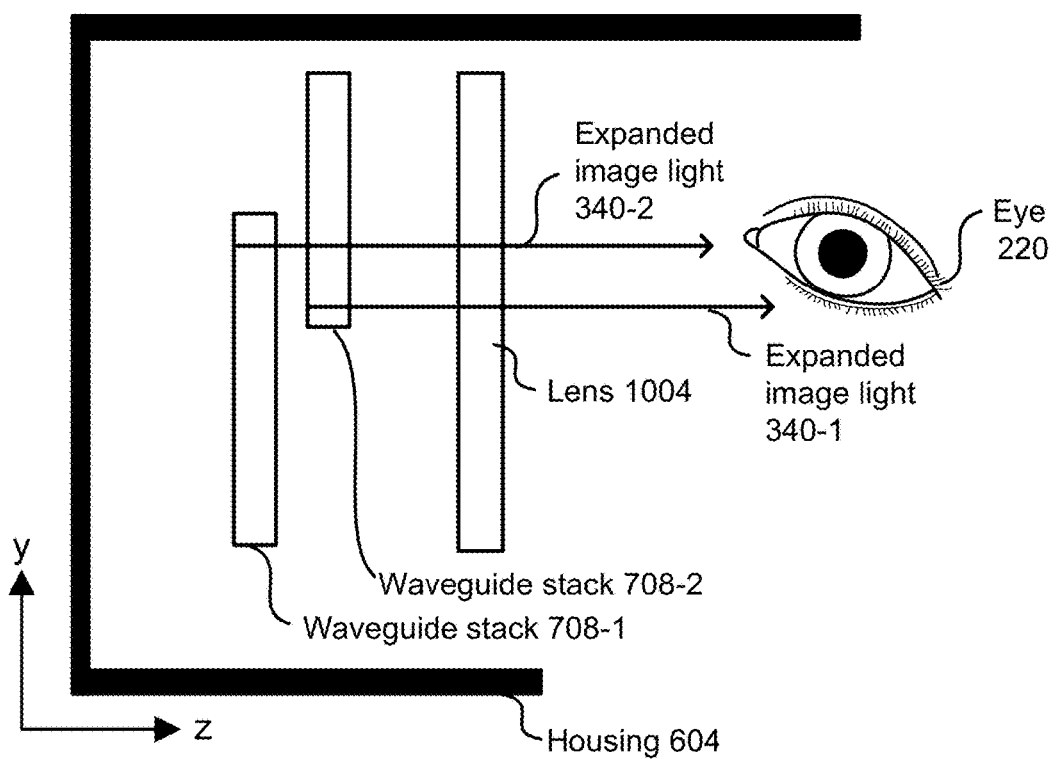
FIG. 10 is a simplified diagram of an embodiment of a varifocal lens in the virtual-reality headset.

FIG. 10 is a simplified diagram of an embodiment of using a lens 1004 in the virtual-reality headset 600. FIG. 10 depicts the housing 604 and the first waveguide stack 708-1 and the second waveguide stack 708-2 mounted in the housing 604. Expanded image light 340 is transmitted from the first waveguide stack 708-1 and the second waveguide stack 708-2 to an eye 220 of the user of the virtual-reality headset 600.

A lens 1004 is between waveguide stacks 708 and the eye 220. The lens 1004 can be a varifocal lens, e.g., to change focus of the expanded image light 340. For example, a varifocal lens can be used for accommodation and/or to change focal length so that objects appear closer to the user. In some embodiments, the lens 1004 is monolithic per eye, regardless how many waveguide displays and/or projectors are used (e.g., a varifocal lens is used for light emitted from two to ten projectors and/or waveguide displays 300). A Fresnel structure or profile can be used as part of the lens 1004, even while the lens 1004 is monolithic per eye. In some embodiments, the lens 1004 is between waveguide stacks 708. For example the first waveguide stack 708-1 could be used to project images at a 2-meter focal length and the second waveguide stack 708-2 could be used to project images at infinity. In some embodiments, the lens 1004 is a liquid lens (e.g., having a flexible membrane), a pancake lens (e.g., to reduce optical path length), or a liquid crystal lens (e.g., a Pancharatnam-Berry phase (PBP) lens). In some embodiments, multiple lenses 1004 are used (e.g., one lens 1004 or lens assembly per waveguide display 300). The lens 1004 can have multiple elements. For example, the lens could comprise one or more of the following, going in a direction of z: a varifocal lens; a fixed lens (e.g., from about 0.2 to 3.0 diopters; the fixed lens could be used to protect the varifocal lens from user interference, dirt, etc. and/or the fixed lens can help bias the varifocal lens); and/or a prescription lens insert, which a user could specify and/or change so that the user would not need to wear separate prescription glasses or contacts).

Figure 11:
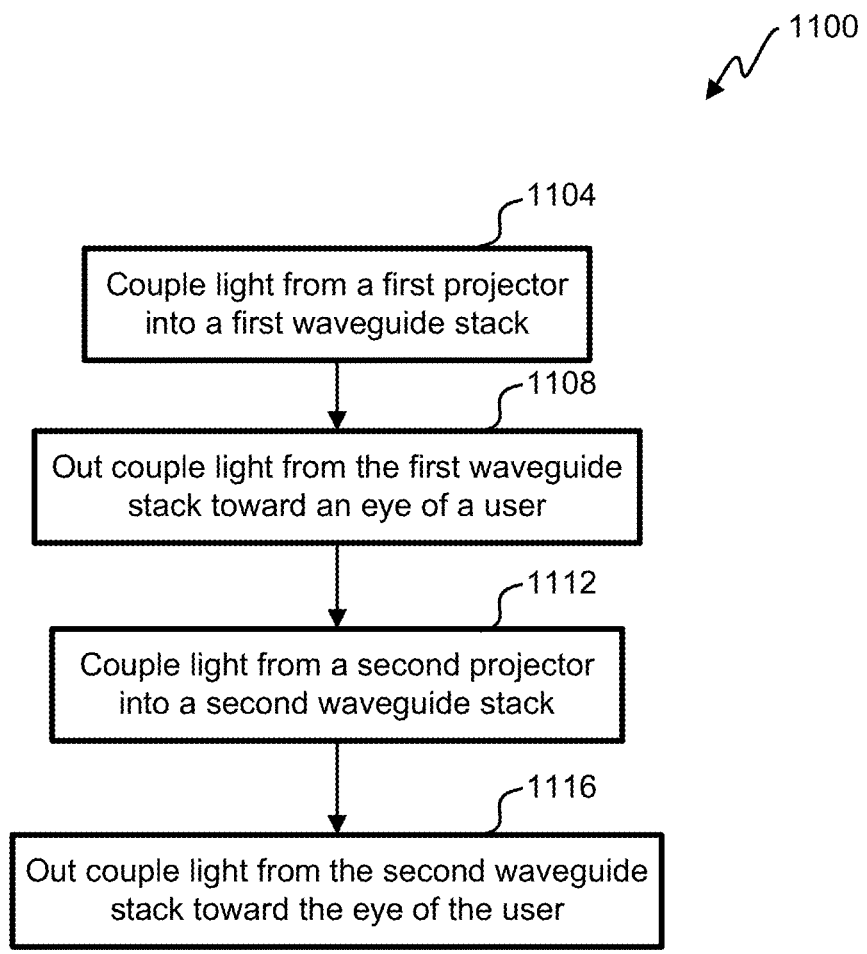
FIG. 11 illustrates an embodiment of a flowchart of a process for using multiple waveguide stacks in the virtual-reality headset.

FIG. 11 illustrates an embodiment of a flowchart of a process 1100 for using multiple waveguide stacks in a virtual-reality system. Process 1100 begins in step 1104 with coupling light from the first projector 704-1 into the first waveguide stack 708-1. The first waveguide stack 708-1 is mounted in the housing 604 as part of the first waveguide display assembly 210-1. The housing 604 is opaque to the user to block ambient light. The first waveguide stack 708-1 comprises three output waveguides 320: the first output waveguide 320-1, the second output waveguide 320-2, and the third output waveguide 320-3, which are configured to present a combined image to a user. In step 1108, light is out coupled from the first waveguide stack 708-1 as first expanded image light 340-1 toward an eye 220 of the user. The first projector 704-1 and the first waveguide stack 708-1 are part of the first waveguide display 300-1

In step 1112 light is coupled from the second projector 704-2 into the second waveguide stack 708-2. The second waveguide stack 708-2 is mounted in the housing 604 as part of the first waveguide display assembly 210-1. The second waveguide stack 708-2 comprises three output waveguides 320: the fourth output waveguide 320-4, the fifth output waveguide 320-5, and the sixth output waveguide 320-6. The second projector 704-2 in the second waveguide stack 708-2 are part of the second waveguide display 300-2. In step 1116, light is out coupled from the second waveguide stack 708-2 as second expanded image light 340-2 toward the eye 220 of the user. The first expanded image light 340-1 and the second expanded image light 340-2 are combined to present a singular scene or image to an eye 220 of the user. In some embodiments, the method further comprises coupling light from a third projector and a fourth projector into a third waveguide stack and a fourth waveguide stack, wherein the third waveguide stack and the fourth waveguide stack are part of the second waveguide display assembly 210-2, and light is coupled out toward a second eye of the user (e.g., the second waveguide display assembly 210-2 being similar to the first waveguide display assembly 210-1 having multiple waveguide displays 300).

Figure 12:
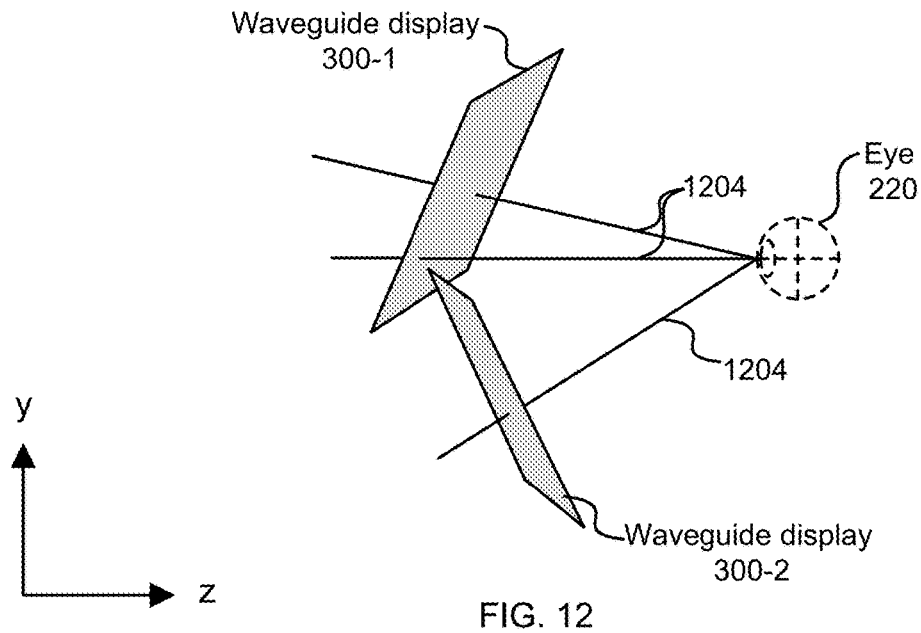
FIG. 12 is a side-view diagram of an embodiment of two waveguide displays as part of a waveguide display assembly.

FIG. 12 is a side-view diagram of an embodiment of two waveguide displays 300 as part of a waveguide display assembly 210. The waveguide display assembly 210 comprises a first waveguide display 300-1 and a second waveguide display 300-2. The first waveguide display 300-1 and/or the second waveguide display 300-2 are canted (e.g., waveguide displays 300 can be canted as described in the '892 application entitled "Canted Augmented Reality Display for Improved Ergonomics," concurrently filed with this application). Canting can be used to help achieve a larger field of view and may, or may not, be used for an ergonomically fit for glasses). By canting a waveguide display 300, a better field of view can be achieved because a normal ray of the waveguide display 300 is in closer alignment to an eyebox of the system than if the waveguide display 300 is not canted. Vectors 1204 from the eye 220 to the waveguide displays 300 are shown to provide perspective. The first waveguide display 300-1 and the second waveguide display 300-2 project images to the eye 220, together, providing a singular tiled scene and/or image to the user having a larger field of view than using just one waveguide display 300.

Figure 13:
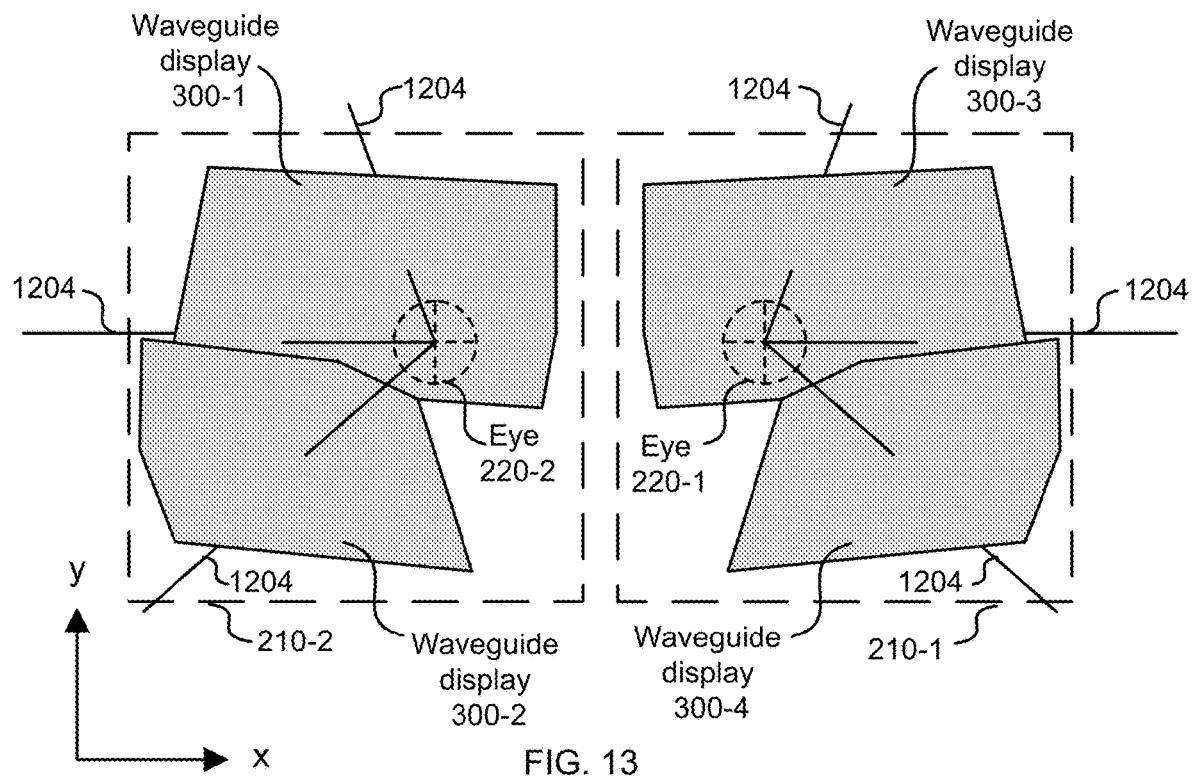
FIG. 13 is a back-view diagram of an embodiment of waveguide displays as part of two waveguide display assemblies.

FIG. 13 is a back-view diagram of an embodiment of waveguide displays 300 as part of two waveguide display assemblies 210. FIG. 13 is a representation of a user's view looking from a back of a head of the user into the waveguide display assemblies 210. A first eye 220-1 (e.g., right eye) and a second eye 220-2 (e.g., left eye) of a user are shown. The first eye 220-1 looks at a first waveguide display assembly 210-1. The second eye 220-2 looks at a second waveguide display assembly 210-2. The second waveguide display assembly 210-2 comprises the first waveguide display 300-1 and the second waveguide display 300-2 shown in FIG. 12. The first waveguide display assembly 210-1 comprises two waveguide displays 300, a third waveguide display 300-3 and a fourth waveguide display 300-4. The first waveguide display assembly 210-1 and the second waveguide display assembly 210-2 provide images to the user so that there is binocular overlap between what is presented by the first waveguide display assembly 210-1 and what is presented by the second waveguide display assembly 210-2. In some configurations, binocular overlap is 80% or greater for what is presented in a central 50 degree radius cone to each eye. Waveguide displays 300 can be tiled so that there is some physical overlap of the waveguide displays 300.

Figure 14:
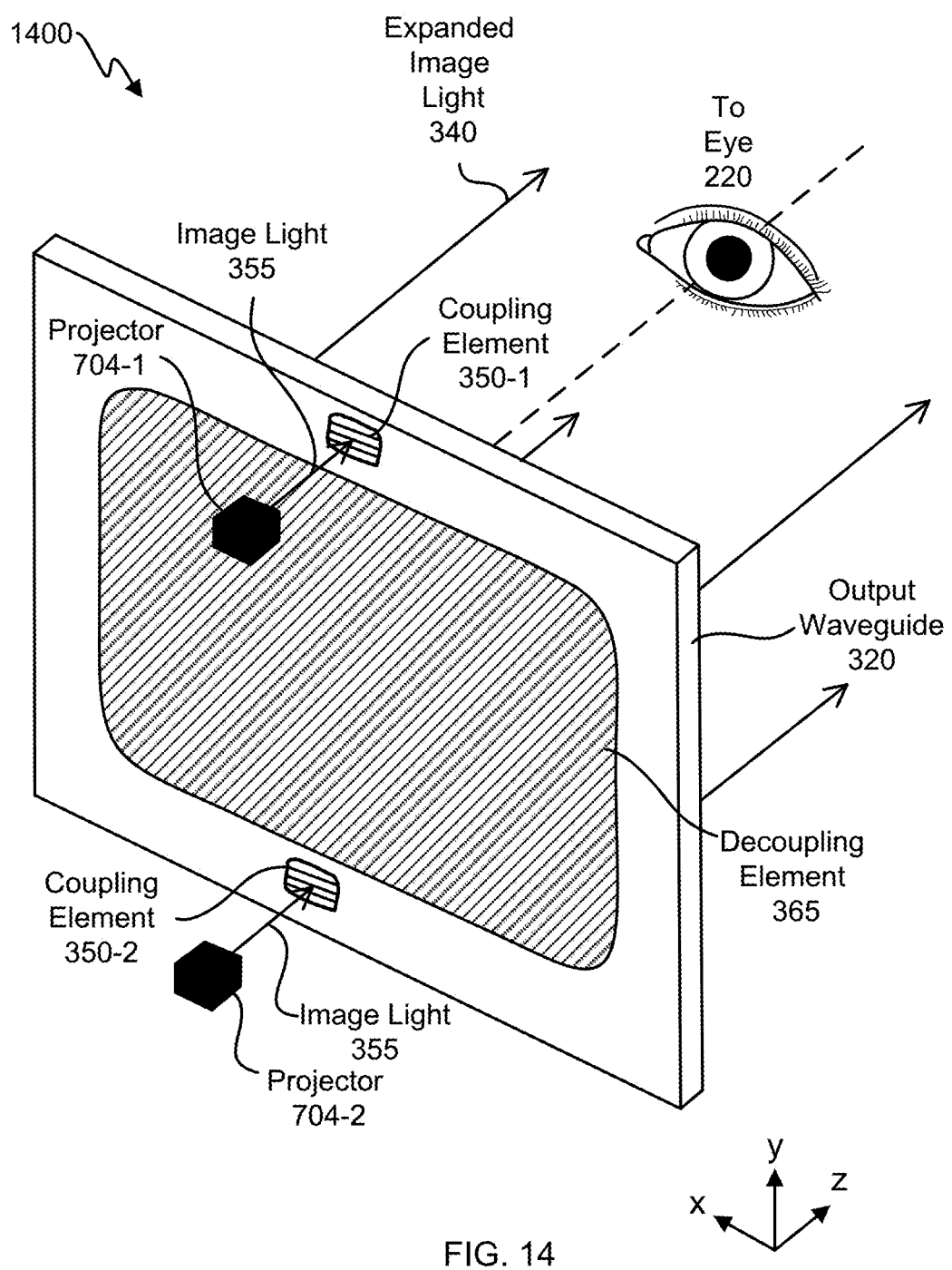
FIG. 14 illustrates an isometric view of an embodiment of light from two projectors being coupled into an output waveguide.

FIG. 14 illustrates an isometric view of an embodiment of light from two projectors being coupled into an output waveguide 320. Image light 355 from a first projector 704-1 is coupled into a first coupling element 350-1 of the output waveguide 320; image light 355 from a second projector 704-2 is coupled into a second coupling element 350-2 of the output waveguide 320. The first projector 704-1 is configured to generate light to produce a first image. The second projector 704-2 is configured to generate light to produce a second image. Each projector 704 has a lens (e.g., optics system 415) to produce an image from one or more light sources (e.g., source 410).

Light coupled into the output waveguide 320 is coupled out of the output waveguide 320 by the decoupling element 365. The output waveguide 320 is configured to expand the first image and the second image. Light coupled out of the output waveguide 320 is expanded image light 340. Light is coupled out of the output waveguide 320 as a single image to a user of the display 110. In some embodiments, expanded image light 340 from the first image overlaps a portion of expanded image light 340 from the second image so that a combination of the first image and the second image make up the single image (e.g., a single scene presented to the user).

By having light from multiple projectors 704, a field of view of the expanded image light 340 can be increased. By coupling light from two, three, four, or more projectors 704 into the output waveguide 320, the field of view is increased. The output waveguide 320 can be part of a waveguide stack 708.

Figure 15:
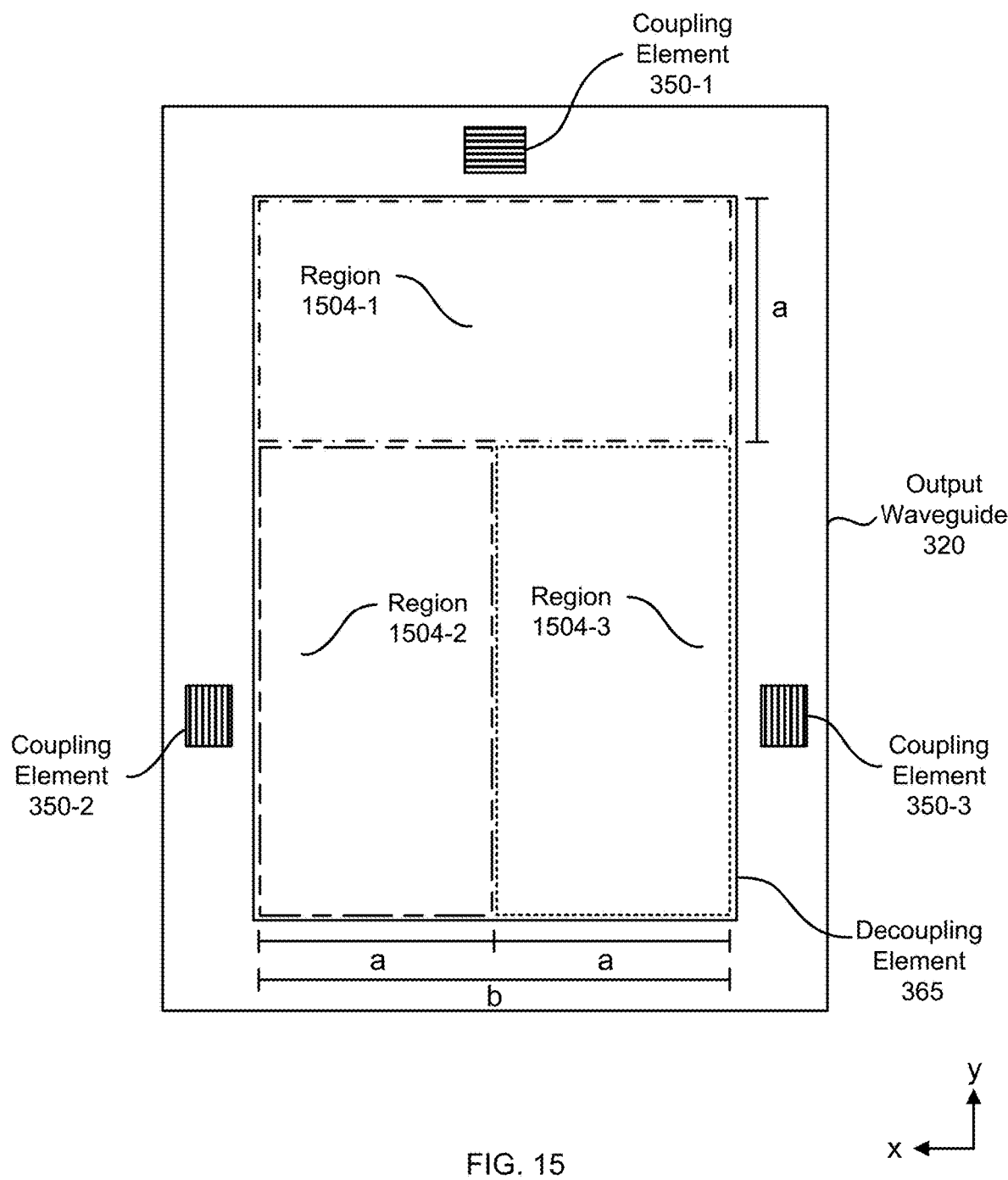
FIG. 15 illustrates an embodiment of an output waveguide configured to out couple light from three projectors.

FIG. 15 illustrates an embodiment of an output waveguide 320 configured to couple light from three projectors 704. The output waveguide 320 comprises a first coupling element 350-1, a second coupling element 350-2, a third coupling element 350-3, and a decoupling element 365 (sometimes referred to as an output coupler). Light from the first projector 704-1, e.g., the first image, is coupled into the output waveguide 320 by the first coupling element 350-1. Light from the second projector 704-2, e.g., the second image, is coupled into the output waveguide 320 by the second coupling element 350-2. Light from a third projector, e.g., a third image, is coupled into the output waveguide 320 by the third coupling element 350-1. To couple light from more projectors into the output waveguide 320, more coupling elements 350 could be used (e.g., a fourth coupling element is configured to couple light from a fourth projector, for example a fourth image, into the output waveguide 320).

Light coupled into the first coupling element 350-1 (e.g., the first image) is coupled out of a first region 1504-1 of the output coupler. Light coupled into the second coupling element 350-2 (e.g., the second image) is coupled out of a second region 1504-2 of the output coupler. Light coupled into the third coupling element 350-3 (e.g., the third image) is coupled out of a third region 1504-3 of the output coupler. The first region 1504-1 has a height a and a width b. The second region 1504-2 and the third region 1504-3 each have a width b and a height a. Light coupled out of regions 1504 of the output coupler are combined to provide a single image to the user. Regions 1504 are tiled to provide a greater field of view to the user. In some embodiments, a corresponds to a 40 degree field of view and b corresponds to an 80 degree field of view. In practice, regions 1504 can overlap each other to provide a seamless single image covering a defined eyebox region. The coupling elements in FIG. 15 are separate from each other (e.g., at different locations on the output waveguide 320).

Figure 16:
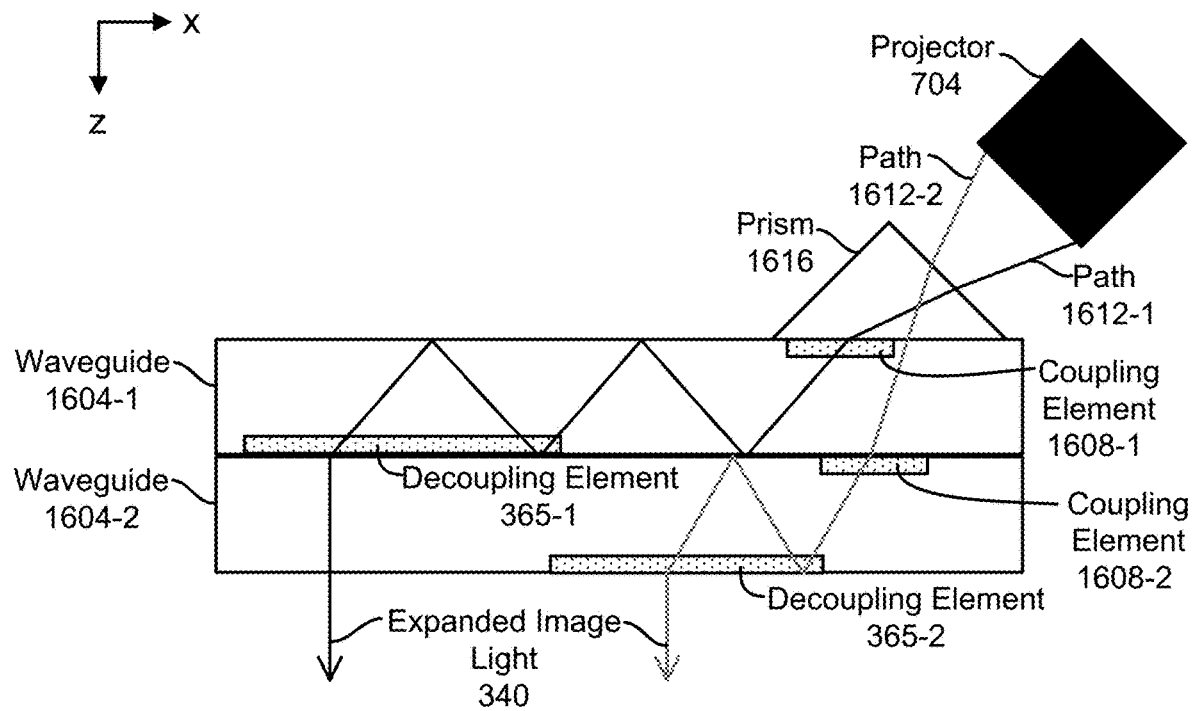
FIG. 16 is an embodiment of light from one projector being coupled into two waveguides.

FIG. 16 is an embodiment of light from a projector 704 being coupled into a first waveguide 1604-1 and into a second waveguide 1604-2. The waveguides 1604 can be similar to the output waveguide 320. The first waveguide 1604-1 comprises a first coupling element 1608-1. The second waveguide 1604-2 comprises a second coupling element 1608-2. The projector 704 is configured to produce light, wherein light is projected in a first field of view. The first field of view is greater than can be coupled into the first waveguide 1604-1 by the first coupling element 1608-1 and greater than can be coupled into the second waveguide 1604-2 by the second coupling element 1608-2.

A first portion of light from the projector 704, represented by a first path 1612-1, is coupled into the first waveguide 1604-1 (e.g., using the first coupling element 1608-1), wherein the first portion of light corresponds to a first portion of the first field of view. A second portion of light from the projector 704, represented by a second path 1612-2, is coupled into the second waveguide 1604-2 (e.g., using the second coupling element 1608-2), wherein the second portion of light corresponds to a second portion of the first field of view.

A first decoupling element 365-1 is configured to output light from the first waveguide 1604-1. A second decoupling element 365-2 is configured to output light from the second waveguide 1604-2, wherein light coupled out of the second waveguide 1604-2 is configured to produce a single image with light coupled out of the first waveguide 1604-1, and wherein the single image has a second field of view. Thus the projector 704 has a first field of view; and the expanded image light 340 has a second field of view, which is a combination of light coupled out of both the first waveguide 1604-1 and the second waveguide 1604-2.

In some embodiments, the second field of view is equal to or greater than the first field of view; and/or the second field of view is equal to the first field of view, plus or minus 10% of the first field of view. The first field of view can have an angle range that is greater than can be coupled into the first waveguide 1604-1 by the first coupling element 1608-1 or than can be coupled into the second waveguide 1604-2 by the second coupling element 1608-2. Further, more than one projector 704 can be used to couple light into the first waveguide 1604-1 and the second waveguide 1604-2. For example, a second, third, fourth, fifth, and/or sixth projector 704 could be used. A waveguide 1604 can be configured to couple light from two or more projectors 704 by having two or more coupling elements 1608 (e.g., as described in conjunction with FIG. 15) per waveguide 1604. A prism 1616 can be used to help couple light from the projector 704 into the first waveguide 1604-1 and/or into the second waveguide 1604-2. The first waveguide 1604-1 can be part of a first waveguide stack, with light from the projector 704 being coupled into output waveguides 320 of the first waveguide stack; and the second waveguide 1604-2 can be part of a second waveguide stack with light from the projector 704 being coupled into output waveguides 320 of the second waveguide stack.

Figure 17:
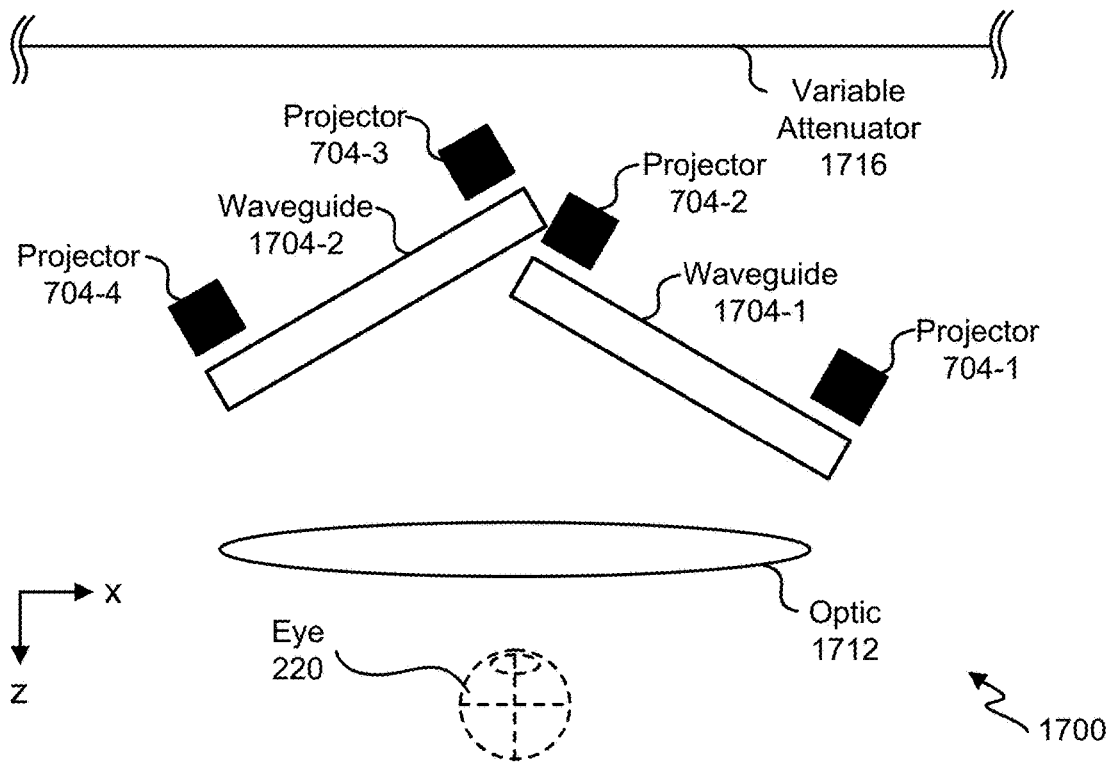
FIG. 17 illustrates an embodiment waveguides with multiple projectors canted to provide an increased field of view.

FIG. 17 illustrates an embodiment of a waveguide display system 1700 having waveguides 1704 with multiple projectors 704, and the waveguides 1704 are canted to provide an increased field of view. The waveguide display system 1700 comprises a first waveguide 1704-1, a second waveguide 1704-2, a first projector 704-1, a second projector 704-2, a third projector 704-3, and a fourth projector 704-4. The first projector 704-1 is configured to generate a first image; the second projector 704-2 is configured to generate a second image; the third projector 704-3 is configured to generate a third image; and the fourth projector 704-4 is configured to generate a fourth image. Light of the first image and light of the second image is coupled into the first waveguide 1704-1; light of the third image and light of the fourth image is coupled into the second waveguide 1704-2 (e.g., as discussed in conjunction with FIGS. 14 and 15). Light of the first image and of the second image is coupled out of the first waveguide 1704-1 as a single image to an eye 220 of a user. Light of the third image and of the fourth image is coupled out of the second waveguide 1704-2 as the single image, along with light of the first image and light of the second image. By using multiple projectors 704 per waveguide 1704 and canting the waveguides 1704, a large field of view can be presented to a user (e.g., equal to or greater than 100 degrees and/or equal to or less than 240 degrees). The first waveguide 1704-1 can be part of a first waveguide stack, with light from the first projector 704-1 and the second projector 704-2 being coupled into waveguides of the first waveguide stack; and the second waveguide 1704-2 can be part of a second waveguide stack, with light from the third projector 704-3 and the fourth projector 704-4 being coupled into waveguides of the second waveguide stack. Additional waveguide stacks could be used to further increase the field of view and/or more than two projectors 704 per waveguide stack could be used.

An optic 1712 can be used to modify expanded image light 340 coupled out of the first waveguide 1704-1 and the second waveguide 1704-2. In some embodiments the optic 1712 is similar to lens 1004. One optic 1712 is used per eye 220 and/or the optic 1712 is a monolithic optical element (e.g., for optical clarity and/or ease of manufacturing), though in some embodiments, more complex optical elements (e.g., multiple lenses, in the z-axis direction, per eye 220) can be used.

The embodiment of the waveguide display system 1700 shown in FIG. 17 further includes a variable attenuator 1716. The variable attenuator 1716 can be used as part of the housing 604. The variable attenuator 1716 is used to block real-world light or let some real-world light to reach the eye 220. For example, under normal operation, the variable attenuator 1716 blocks real-world light (e.g., electronically controlled by the engine 555). But if the user approaches a hazard, such as a wall, the variable attenuator 1716 can let some real-world light pass to the eye 220 so the user can see the hazard. The variable attenuator 1716 can comprise a liquid-crystal layer and crossed polarizers to electrically change the variable attenuator 1716 from blocking real-world light to passing real-world light through the housing 604. Thus the variable attenuator 1716 is configured to block light at one time and pass light at another time. The variable attenuator 1716 is variable because attenuation of light is not constant over time.

Figure 18:
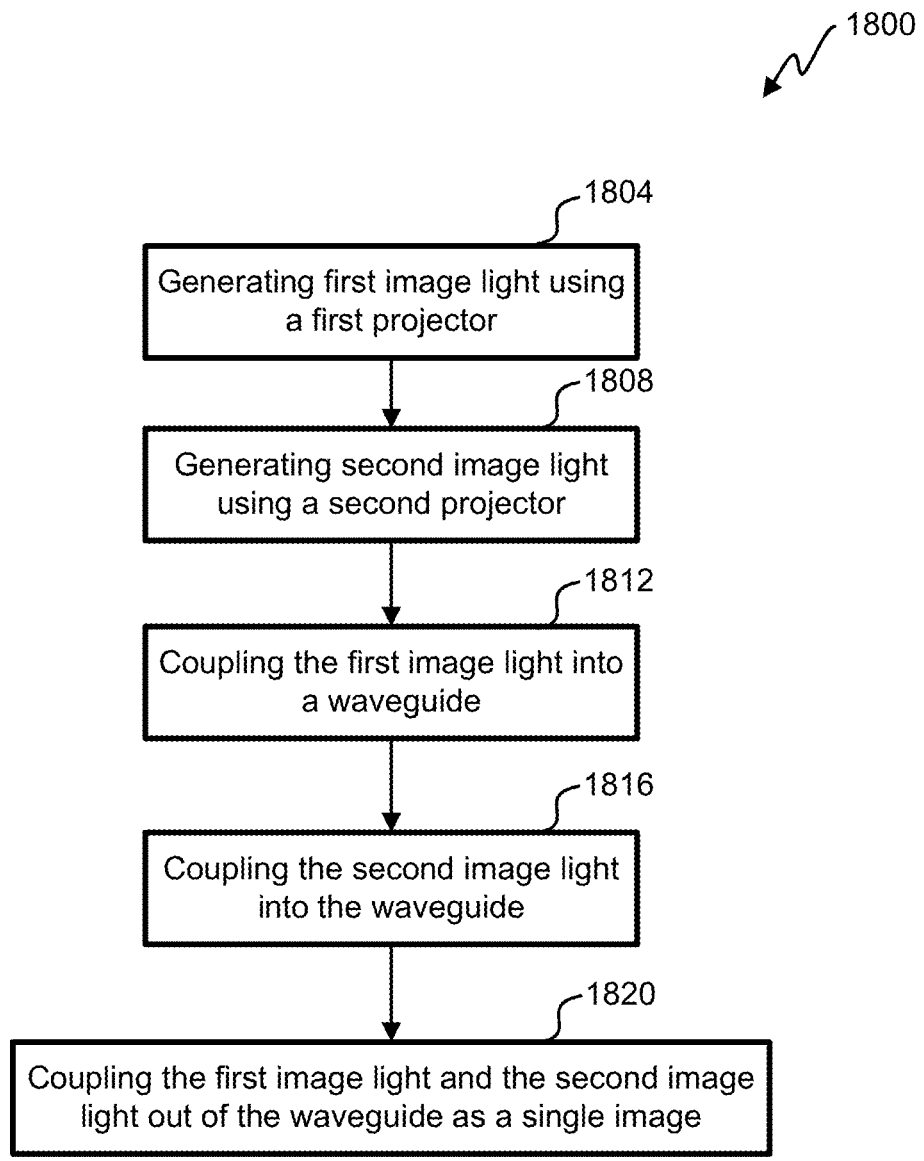
FIG. 18 illustrates an embodiment of a flowchart of a process for coupling light from two projectors into a waveguide.

FIG. 18 illustrates an embodiment of a flowchart of a process 1800 for coupling light from two projectors (e.g., projectors 704) into a waveguide. Process 1800 begins in step 1804 with generating first image light using a first projector. In step 1808, second image light is generated using a second projector. The first image light is coupled into the waveguide (e.g., using a first coupling element), step 1812. The second image light is coupled into the waveguide (e.g., using a second coupling element), step 1816. In step 1820, the first image light and the second image light are out coupled from the waveguide as a single image.

In some embodiments, the single image has a field of view equal to or greater than 100 degrees and equal to or less than 240 degrees. The method can further comprise generating third image light using a third projector, coupling the third image light into the waveguide, and coupling the third image light out of the waveguide as a single image with the first image light and the second image light. More than three projectors could be used to couple light into the waveguide. The single image is presented to a single eye 220 of the user; and/or a second single image is presented to a second eye 220 of the user using a second waveguide display assembly 210.

By using multiple waveguides (e.g., tiling waveguides), using multiple projectors per waveguide (e.g., tiling field of views from a waveguide), and/or using multiple waveguides per projector, field of view can be increased. The field of view can be from 90 degrees to 240 degrees. For example, multiple projectors coupled into one waveguide stack could be used to increase a field of view (e.g., FIGS. 14 and 15); tiled waveguide stacks (e.g., FIG. 13) could be used to increase a field of view; and canted and tiled waveguide stacks, each having two or more projectors (e.g., FIG. 17) could be used.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure. For example, a coupling element (e.g., coupling element 350) has discrete elements, which can be physically separate (e.g., three discrete prisms and/or gratings to couple in red light, green light, and blue light from three projectors; thus each discrete prism could be optimized based on wavelength). A number of discrete elements can depend on a number of projectors coupling light into the coupling element. In some embodiments, the coupling element can be configured to work with multiple projectors (e.g., one grating and/or a single monolithic prism to couple in red light, green light, and blue light from three projectors; the single monolithic prism could be configured to couple in the three different colors of light). Four coupling elements 350 can be used per waveguide, with each coupling element 350 being configured to couple light from three different monochromatic projectors, resulting in light from 12 projectors being coupled into one waveguide. In some embodiments, one waveguide stack comprises three waveguides, one waveguide for each primary color; and there are four projectors that couple light into each waveguide, so that light from 12 projectors is coupled into one waveguide stack. More or less projectors could be used according to how many regions 1504 are used. Waveguides and waveguide stacks can have different number and/or shapes of regions 1504. For example, a first waveguide (e.g., for expanding red light) could have two regions 1504, and a second waveguide (e.g., for expanding blue light) could have four regions (e.g., so that blue light could have higher resolution than red light). Waveguide stacks can have different number of regions (e.g., a first waveguide stack has waveguides with two or three regions 1504 and a second waveguide stack has waveguides with, four, five, or six regions 1504; the first waveguide stack and the second waveguide stack both presenting light to the same eye of a user). Other permutations and variations are possible depending on application, thus there could be light from 1, 2, 3, 4, 5, 6, 7, 8, 9, 10, 11, 12, 13, 14, 15, 16, 17, 18, 19, 20, or more projectors coupled into one waveguide or waveguide stack (e.g., 2 to 12 projectors per waveguide or waveguide stack are used). In some embodiments, a waveguide stack comprises one, two, three or four waveguides.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations described. The apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A system comprising:
   a first projector configured to generate light to produce a first image of a first field of view;
   a second projector configured to generate light to produce a second image of a second field of view; and
   a waveguide, configured to:
     couple light of the first image into the waveguide;
     couple light of the second image into the waveguide; and
     couple light of the first image and light of the second image out of the waveguide as a single image of a combined field of view to one eye of a user of the system,
   wherein:
     the waveguide comprises a decoupling element;
     the light of the first image is coupled out of the waveguide at a first region of the decoupling element; and
     the light of the second image is coupled out of the waveguide at a second region of the decoupling element.

2. The system of claim 1, wherein the waveguide is configured to expand the first image and the second image to cover a defined eyebox region.

3. The system of claim 1, further comprising a second waveguide configured to couple light from the first projector into the second waveguide.

4. The system of claim 1, further comprising:
   a first input coupler configured to couple light of the first image into the waveguide; and
   a second input coupler configured to couple light of the second image into the waveguide, wherein the first input coupler is separate from the second input coupler.

5. The system of claim 1, wherein the waveguide is a first waveguide and the system further comprises:
   a third projector configured to generate light to produce a third image;
   a fourth projector configured to generate light to produce a fourth image; and
   a second waveguide, configured to:
     couple light of the third image into the second waveguide;
     couple light of the fourth image into the second waveguide; and
     couple light of the third image and light of the fourth image out of the second waveguide as the single image, along with the light of the first image and light of the second image, to the user of the system.

6. The system of claim 5, further comprising an optic between the first waveguide and the second waveguide to produce the single image with elements having different focal lengths.

7. The system of claim 5, wherein:
   the first waveguide is separated from and partially overlapping with the second waveguide to increase a field of view of the single image presented to the user;
   the system further comprises an optic between the eye of the user and the first waveguide; and
   the optic is between the eye of the user and the second waveguide.

8. The system of claim 1, further comprising:
   a third projector configured to generate light to produce a third image; and
   a fourth projector configured to generate light to produce a fourth image, and the waveguide is configured to:
     couple light of the third image into the waveguide; and
     couple light of the fourth image into the waveguide.

9. The system of claim 1, further comprising three to twelve projectors, and the waveguide is configured to couple light from the three to twelve projectors into the waveguide.

10. The system of claim 1, wherein the waveguide is part of a head-mounted display.

11. The system of claim 1, further comprising a variable attenuator configured to block light at one time and pass light at another time.

12. A method comprising:
    generating first image light for a first field of view using a first projector;
    generating second image light for a second field of view using a second projector;
    coupling the first image light into a waveguide;
    coupling the second image light into the waveguide; and
    coupling the first image light and the second image light out of the waveguide as a single image for a combined field of view to one eye of a user,
    wherein:
      the waveguide comprises a decoupling element;
      the first image light is coupled out of the waveguide at a first region of the decoupling element; and
      the second image light is coupled out of the waveguide at a second region of the decoupling element.

13. The method of claim 12, wherein the single image has a field of view equal to or greater than 100 degrees and equal to or less than 240 degrees.

14. The method of claim 12, wherein the first image light is coupled into the waveguide using a first input coupler and the second image light is coupled into the waveguide using a second input coupler.

15. The method of claim 12, further comprising:
    generating third image light using a third projector; and
    coupling the third image light into the waveguide; and
    coupling the third image light out of the waveguide as the single image with the first image light and the second image light to the eye of the user.

16. A system comprising:
    a projector configured to produce light, wherein light is projected in a first field of view;
    a first waveguide configured to couple a first portion of light from the projector into the first waveguide, wherein the first portion of light corresponds to a first portion of the first field of view;
    a second waveguide configured to couple a second portion of light from the projector into the second waveguide, wherein the second portion of light corresponds to a second portion of the first field of view;

a first decoupling element configured to output light from the first waveguide; and a second decoupling element configured to output light from the second waveguide, wherein the light outputted from the second waveguide and the light outputted from the first waveguide produce a single image to one eye of a user of the system, wherein the single image has a second field of view greater than the first portion of the first field of view or the second portion of the first field of view.

17. The system of claim 16, wherein:

the second field of view is equal to or greater than the first field of view; or the second field of view is equal to the first field of view, plus or minus 10% of the first field of view.

18. The system of claim 16, wherein the first field of view has an angle range greater than an angle range of light that can be coupled into the first waveguide or the second waveguide.

19. The system of claim 16, wherein:

the projector is a first projector and the system further comprises a second projector configured to generate light; and the first waveguide is configured to couple light from the second projector into the first waveguide.

* * * * *